(12) United States Patent
Spoerke et al.

(10) Patent No.: US 9,847,149 B2
(45) Date of Patent: Dec. 19, 2017

(54) ELECTROCHEMICAL ION SEPARATION IN MOLTEN SALTS

(71) Applicant: Sandia Corporation, Albuquerque, NM (US)

(72) Inventors: Erik David Spoerke, Albuquerque, NM (US); Jon Ihlefeld, Albuquerque, NM (US); Karen Waldrip, Albuquerque, NM (US); Jill S. Wheeler, Albuquerque, NM (US); Harlan James Brown-Shaklee, Albuquerque, NM (US); Leo J. Small, Albuquerque, NM (US); David R. Wheeler, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 148 days.

(21) Appl. No.: 15/054,766

(22) Filed: Feb. 26, 2016

(65) Prior Publication Data

US 2016/0196888 A1 Jul. 7, 2016

Related U.S. Application Data

(63) Continuation of application No. 14/660,696, filed on Mar. 17, 2015, now abandoned.
(Continued)

(51) Int. Cl.
*G21F 9/12* (2006.01)
*G21F 9/30* (2006.01)
(Continued)

(52) U.S. Cl.
CPC ............. *G21F 9/12* (2013.01); *B01D 61/44* (2013.01); *C04B 35/447* (2013.01); *C04B 35/495* (2013.01); *C04B 35/6261* (2013.01); *C04B 35/632* (2013.01); *C04B 35/634* (2013.01); *C04B 35/638* (2013.01);
(Continued)

(58) Field of Classification Search
CPC ..... C22B 26/10; C04B 35/447; C04B 35/495; C04B 35/6261; C04B 35/632; C04B 35/643; C04B 35/638; C04B 2111/00801; C04B 2235/3201; C04B 2235/3215; C04B 2235/3227; C04B 2235/3244; C04B 2235/3251; C04B 2235/3418; C04B 2235/6562; C04B 2235/6587; C04B 2235/76; C04B 2235/761; C04B 2235/764; C04B 2235/9669; B01D 61/44;
(Continued)

(56) References Cited

U.S. PATENT DOCUMENTS 4,108,743 A * 8/1978 Minck .................. C25C 3/00
                                                         205/367
6,770,187 B1    8/2004 Putter et al.
(Continued)

*Primary Examiner* — Ciel P Thomas
(74) *Attorney, Agent, or Firm* — Kevin W. Bieg

(57) ABSTRACT

A purification method that uses ion-selective ceramics to electrochemically filter waste products from a molten salt. The electrochemical method uses ion-conducting ceramics that are selective for the molten salt cations desired in the final purified melt, and selective against any contaminant ions. The method can be integrated into a slightly modified version of the electrochemical framework currently used in pyroprocessing of nuclear wastes.

19 Claims, 30 Drawing Sheets

Related U.S. Application Data

(60) Provisional application No. 61/955,347, filed on Mar. 19, 2014.

(51) Int. Cl.

| | | |
|---|---|---|
| *B01D 61/44* | (2006.01) | |
| *B01D 69/02* | (2006.01) | |
| *B01D 71/02* | (2006.01) | |
| *C22B 26/10* | (2006.01) | |
| *C22B 26/20* | (2006.01) | |
| *C04B 35/447* | (2006.01) | |
| *C04B 35/495* | (2006.01) | |
| *C04B 35/626* | (2006.01) | |
| *C04B 35/632* | (2006.01) | |
| *C04B 35/634* | (2006.01) | |
| *C04B 35/638* | (2006.01) | |
| *C22B 15/00* | (2006.01) | |
| *C04B 111/00* | (2006.01) | |

(52) U.S. Cl.
CPC .......... *C22B 15/0026* (2013.01); *C22B 26/10* (2013.01); *C22B 26/20* (2013.01); *G21F 9/30* (2013.01); *B01D 69/02* (2013.01); *B01D 71/024* (2013.01); *B01D 2325/14* (2013.01); *C04B 2111/00801* (2013.01); *C04B 2235/3201* (2013.01); *C04B 2235/3203* (2013.01); *C04B 2235/3215* (2013.01); *C04B 2235/3227* (2013.01); *C04B 2235/3244* (2013.01); *C04B 2235/3251* (2013.01); *C04B 2235/3418* (2013.01); *C04B 2235/6562* (2013.01); *C04B 2235/6587* (2013.01); *C04B 2235/76* (2013.01); *C04B 2235/761* (2013.01); *C04B 2235/764* (2013.01); *C04B 2235/9669* (2013.01)

(58) Field of Classification Search
CPC .... B01D 69/02; B01D 71/02; B01D 2325/14; G21F 9/12; G21F 9/30
See application file for complete search history.

(56) References Cited

U.S. PATENT DOCUMENTS

| | | |
|---|---|---|
| 2002/0079214 A1 | 6/2002 | Nishi et al. |
| 2006/0141346 A1 | 6/2006 | Gordon et al. |
| 2010/0203383 A1 | 8/2010 | Weppner |
| 2014/0008239 A1 | 1/2014 | Bhavaraju |

\* cited by examiner

Li₅La₃Ta₂O₁₂ (Tetrahedral Coordination)

Li₅La₃Ta₂O₁₂ (Octahedral Coordination)

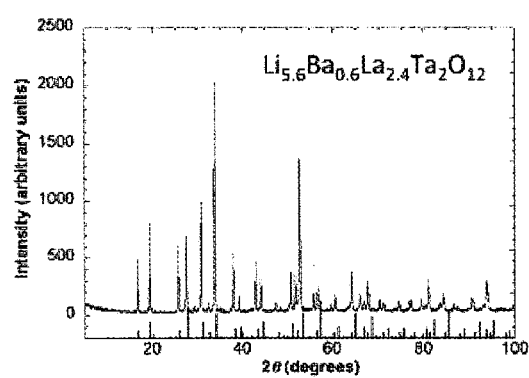
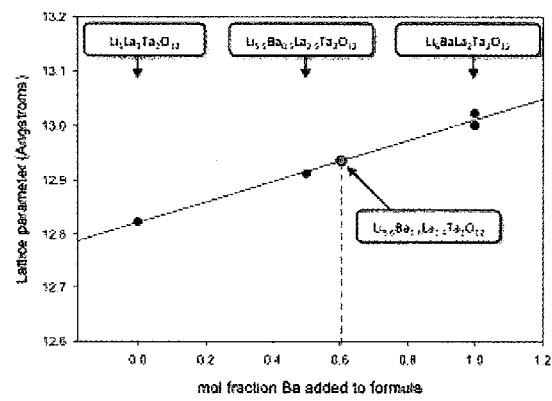
FIG. 11A
FIG. 11B

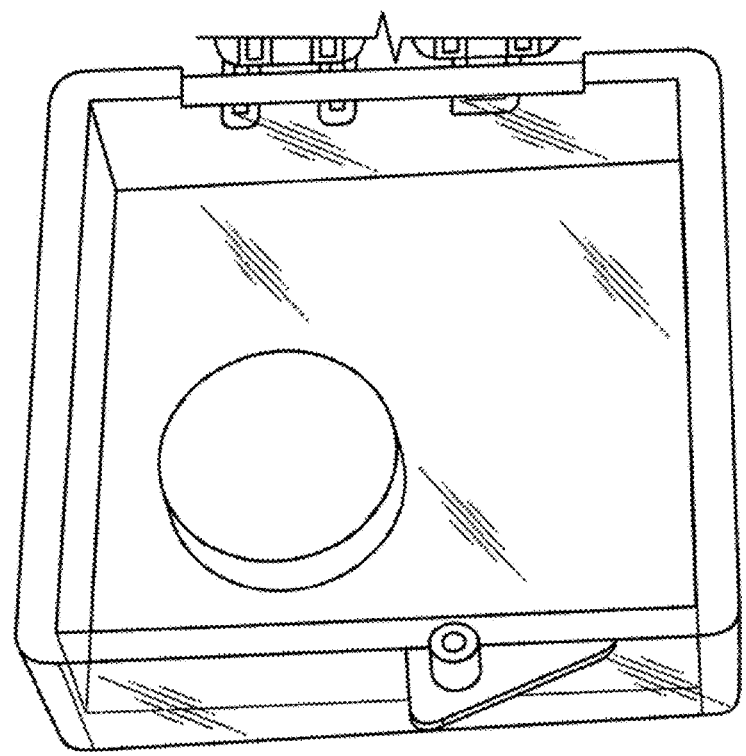
No Salt Bath Exposure
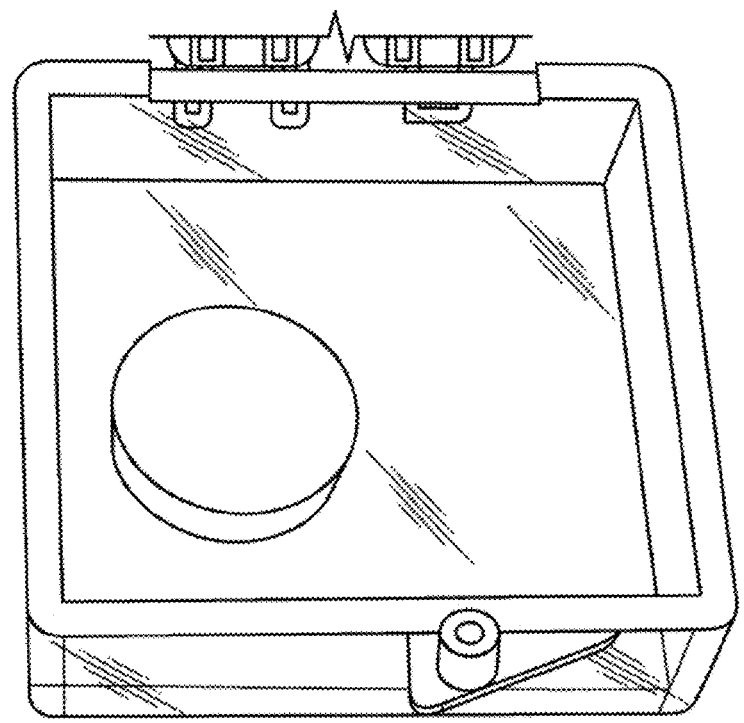
Salt Bath Exposure
FIG. 12A

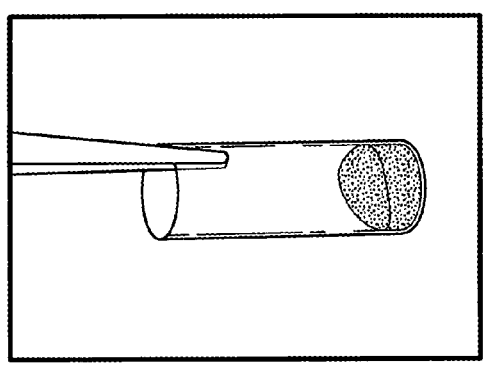
Initial KCl-LiCl-CuCl$_2$ Molten Salt at 400°C

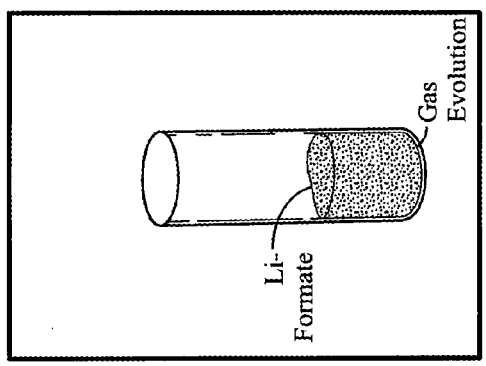
Addition of Li-Formate (LiCOOH) to KCl-LiCl-CuCl$_2$ Molten Salt at 400°C Rapidly Evolves CO$_2$ and H$_2$ gases.

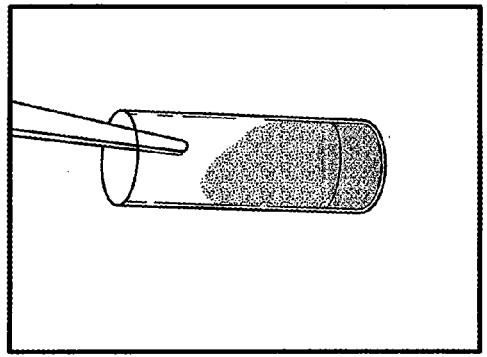
Reddish Color Resulting from Cu-metallization in KCl-LiCl-CuCl$_2$ Molten Salt at 400°C

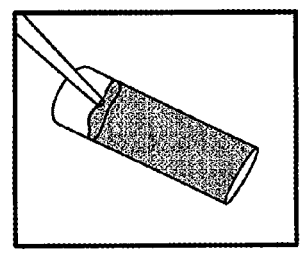
In Cooled Salt, Cu Metal (Reddish-Orange) and Purified LiCl-KCl Salt (White) are Visible (Left).

Overall Reaction:
2LiCOOH + CuCl$_2$ → 2LiCl + Cu(s) + 2CO$_2$ + H$_2$

*FIG. 22*

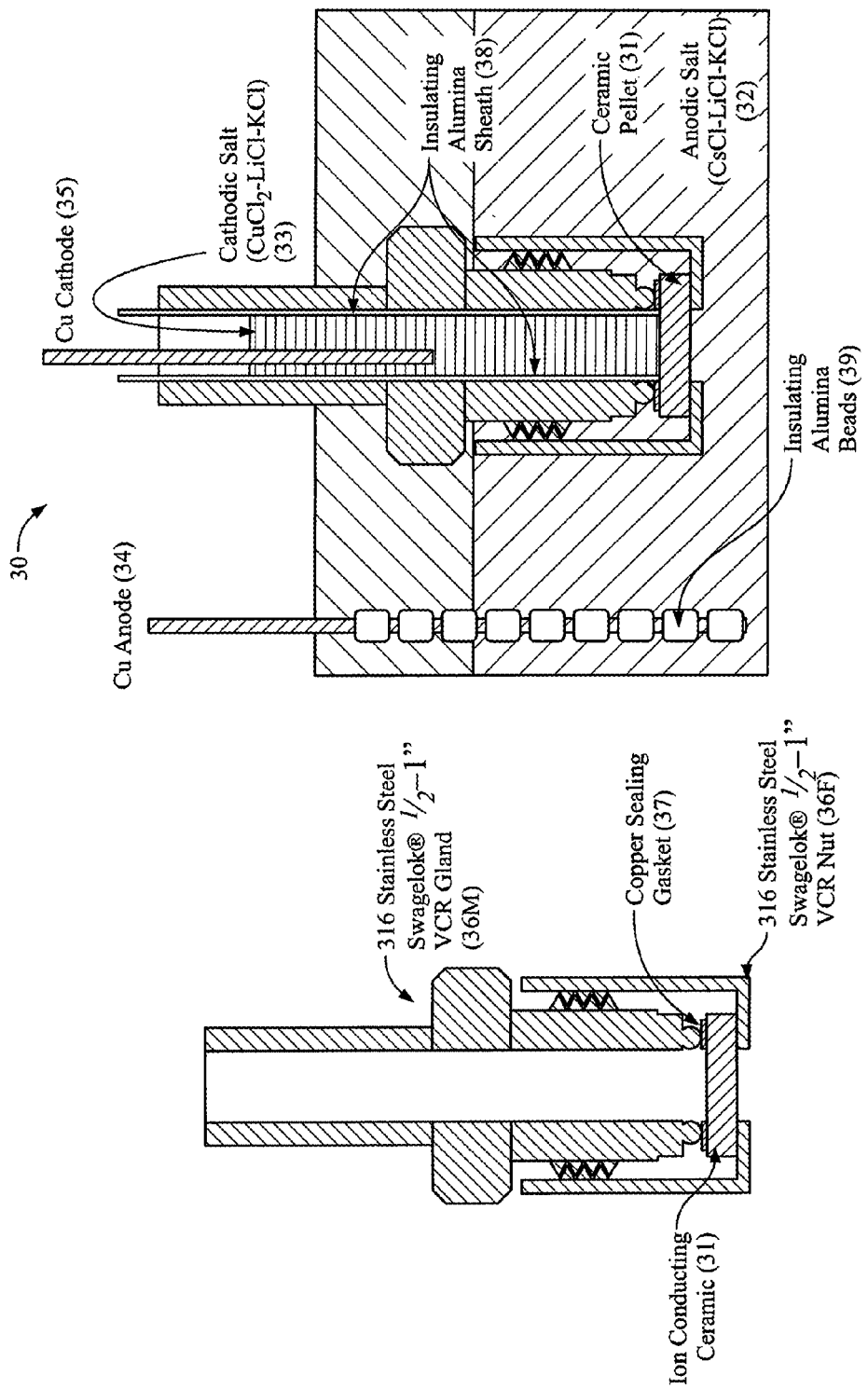

ELECTROCHEMICAL ION SEPARATION IN MOLTEN SALTS

CROSS-REFERENCE TO RELATED APPLICATION

This application is a continuation of application Ser. No. 14/660,696, filed Mar. 17, 2015, which claims the benefit of U.S. Provisional Application No. 61/955,347, filed Mar. 19, 2014, each of which is incorporated herein by reference.

STATEMENT OF GOVERNMENT INTEREST

This invention was made with Government support under contract no. DE-AC04-94AL85000 awarded by the U. S. Department of Energy to Sandia Corporation. The Government has certain rights in the invention.

FIELD OF THE INVENTION

The present invention relates to pyroprocessing and, in particular, to a method and materials for electrochemical ion separation in molten salts.

Although the method can be applied to molten salt purification generally, described herein is an example of the electrochemical purification of molten metal chloride salts used for nuclear waste remediation.

BACKGROUND OF THE INVENTION

Nuclear reprocessing technology has been developed to chemically separate and recover plutonium, uranium, and other actinides from irradiated nuclear fuel. As shown in FIG. 1, pyroprocessing is a high-temperature method that involves introducing spent nuclear fuel into a large scale electrochemical cell, where uranium is first electrochemically dissolved into a molten salt electrolyte and then reductively plated at the cell cathode where it can be collected and ultimately recovered as pure uranium. See H. Lee et al., *Sci. and Tech. Nuc. Install.* 1 (2013). Left behind in the molten salt electrolyte (e.g., LiCl—KCl), however, are residual fission products, transuranics, and other contaminants in the molten salt electrolyte that can degrade the electrochemical efficiency of the system and pose significant challenges to ultimate waste packaging and disposal. Developing a method to efficiently remove the contaminants would facilitate molten salt recycling and reduce the volume of hazardous waste to be packaged for disposal.

Currently there are several methods under development to recapture and purify the molten salts including zeolite-based ion exchange and melt crystallization. See H. Lee et al., *Sci. and Tech. Nuc. Install.*, 1 (2013); D. Lexa and I. Johnson, *Mettalurg. and Mater. Trans.* B 32B, 429, (2001); M. Shaltry et al., *Micropor. Mesopor. Mater.* 152, 185 (2012); and A. Williams et al., *Chem. Eng. Sci.* 89, 258 (2013). In the ion-exchange process, contaminated molten salt is run through a column containing an alumino-silicate zeolite (e.g., Zeolite-4A), which extracts contaminants such as $Sr^{2+}$ or $Cs^+$ from the salt. These zeolites can then be sintered into waste forms for disposal. In contrast, melt crystallization purifies the salts by taking advantage of the increased solubility of contaminants in lower temperature eutectic melts. Contaminated salt is melted, and then slowly cooled from the top down, concentrating the contaminants in the liquid melt phase. Once the salt has completely resolidified, the impurities are concentrated in the lowest portion of the solid, which can be removed and prepared for disposal.

The method of the present invention can facilitate the rapid removal of contaminants, and could potentially be integrated into the existing electrochemical system currently used for pyroprocessing of nuclear waste.

SUMMARY OF THE INVENTION

The present invention is directed to a purification method that uses ion-selective ceramics to electrochemically filter waste products from a molten salt. This invention can be used in collaboration with other methods as part of a multi-stage purification process or it can be used in place of these approaches as a stand-alone purification process. Further, the electrochemical method can be integrated into a slightly modified version of the electrochemical framework currently used in pyroprocessing. Central to this concept is the use of ion-conducting ceramics that are selective for the molten salt cations desired in the final purified melt, and selective against any contaminant ions. Because these ceramics are typically selective for only cationic transport, charge compensation of ions transported through the ceramic may be necessary. This charge compensation can be achieved either through oxidation or reduction of gases, or addition of sacrificial cation or anion-donors in anodic or cathodic salts.

In the particular example described below, the ion-selective ceramics of the invention can be used to electrochemically remove contaminants such as $Cs^+$ from LiCl—KCl molten salts. The chemically and thermally stable ion-conducting ceramics are capable of high rate, selective ion transport. Described herein are the syntheses of ion-conducting ceramics KSICON, LLTO, and LBLTO, though the process may include the use of any ion conducting ceramic (including glasses) or combinations of ceramics with the chemical stability, thermal stability, and selective ion conductivity appropriate for the molten salt and contaminants of a given process. The syntheses of these materials can be tailored to modify critical properties such as ionic conductivity, stability, and ionic selectivity, and these particular ceramics have shown meaningful ionic conductivity (particularly at elevated temperatures) of $Li^+$ and/or $K^+$, relevant to this example. Further, the ion conducting ceramics show selectivity against $Cs^+$ transport, both under passive conditions and under DC bias at elevated temperatures (up to 500° C.). The ceramics also show selectivity against divalent cations (e.g., $Cu^{2+}$). Both KSICON and LBLTO show chemical and structural stability against LiCl—KCl molten salts up to 500° C. Further, the rapid, macroscopic dissolution of Cu metal anodes, and the cathodic plating of Cu and Li metals during galvanostatic discharge experiments (at 100 mA/cm²) indicate that this method can support the rapid mass transport needed to provide a scalable salt purification process.

BRIEF DESCRIPTION OF THE DRAWINGS

The detailed description will refer to the following drawings, wherein like elements are referred to by like numbers.

FIG. 9A is a map showing overlaid Cs signal from CsCl and Zr signal from KSICON. FIG. 9B is a map showing Cs signal only.

FIG. 9C is a map showing Zr signal only.

FIG. 11A is a graph of the X-ray diffraction spectrum for LBLTO compared against the calculated pattern for LLTO ($Li_5La_3Ta_2O_{12}$). FIG. 11B is a graph showing the variation of lattice parameter with Ba-substitution into LLTO. The green dot corresponds to composition of LBLTO shown in FIG. 11A.

FIG. 12A is a photograph comparing LLTO ceramic pellets before and after exposure to LiCl—KCl molten salt at 500° C. for 30 minutes.

FIG. 22 shows a process to chemically reduce trace $CuCl_2$.

FIG. 24A is a schematic illustration of a VCR assembly. FIG. 24B shows the VCR assembly installed in a VCR reactor.

DETAILED DESCRIPTION OF THE INVENTION

Pyroprocessing has emerged as a promising approach to electrochemically separate recyclable actinides from waste fission products. However, further segregation of select fission products (FPs) is still needed for efficient and cost effective waste disposal. The present invention uses ion-conducting ceramics as selective ion filters in the electrochemical segregation of waste FP constituents, specifically the segregation of cesium from molten LiCl—KCl eutectic electrolytes. Removal of short-lived, high heat-generating FPs is an important objective in the consolidation of radioactive waste and is key to recycling the LiCl—KCl molten salt electrolyte used in pyroprocessing.

The method for electrochemical ion separation of the present invention uses ion-selective ceramics for mixed waste separations. The method can use modified potassium-substituted NaSICON (KSICON) and garnet-structured lithium lanthanum tantalate (LLTO) ceramics, including a barium-modified LLTO (LBLTO). Additional ceramics or ceramic glasses can also be used, including LiSICON, LIPON, lithium lanthanum zironates, β"-alumina, and others. In the present case, both the KSICON and LLTO-based forms of ion-conducting ceramics exhibit stability against LiCl—KCl eutectic molten salts at elevated temperatures (e.g., 500° C.). Critically, based on impedance spectroscopy and galvanostatic electroreduction experiments, both ceramics also show effective conductivity of lithium and/or potassium ions, while selecting against the transport of contaminant cesium ions. Therefore, the ion-selective ceramics can be used to electrochemically purify LiCl—KCl-based molten salts. Although the examples described below focus on the removal of $Cs^+$ from LiCl—KCl molten salt, the system can be used to remove other monovalent and multivalent cations from the system as well.

Figure 1:
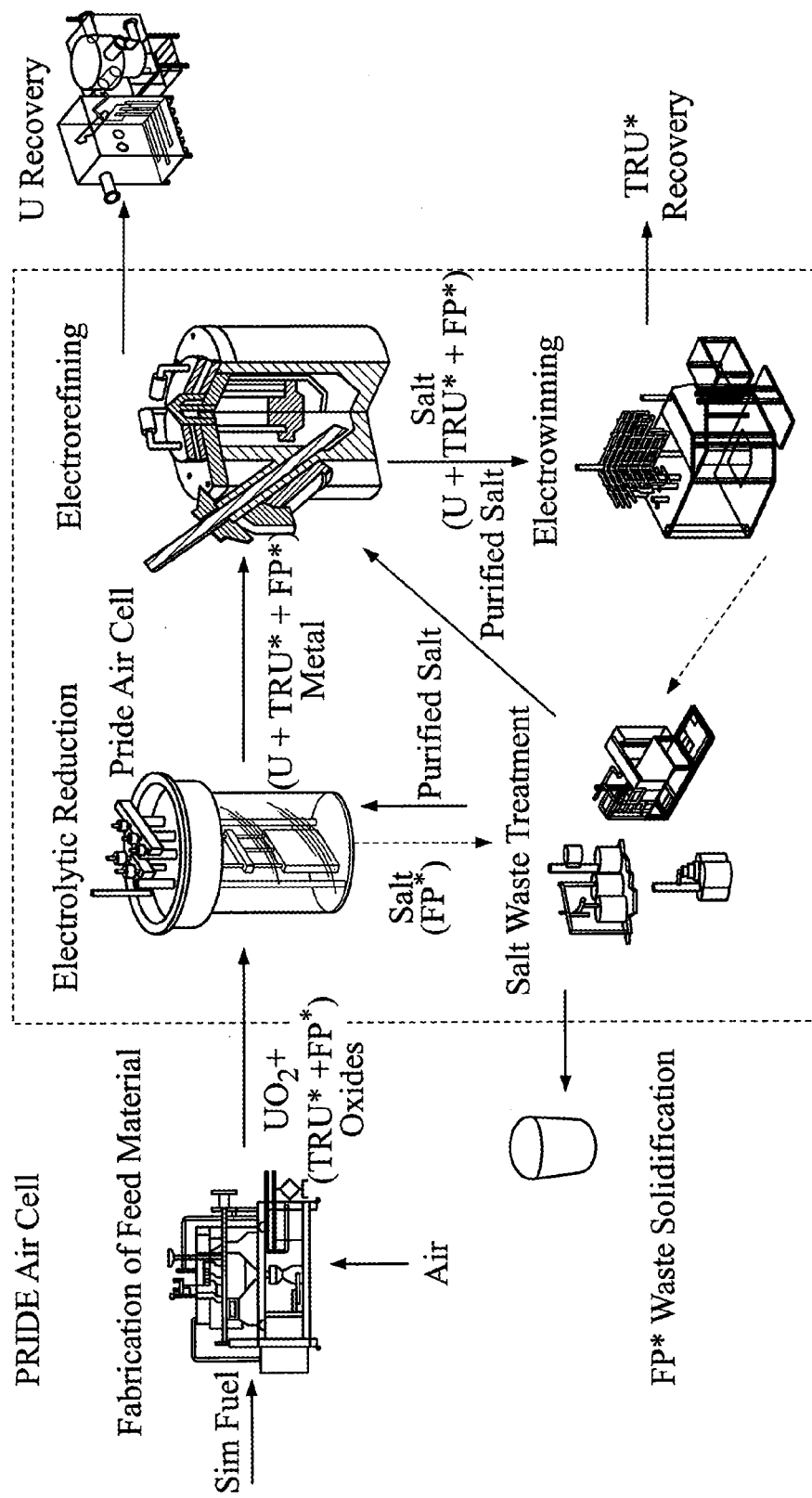
FIG. 1 is a schematic illustration of pyroprocessing nuclear waste recycling technology.
Figure 2:
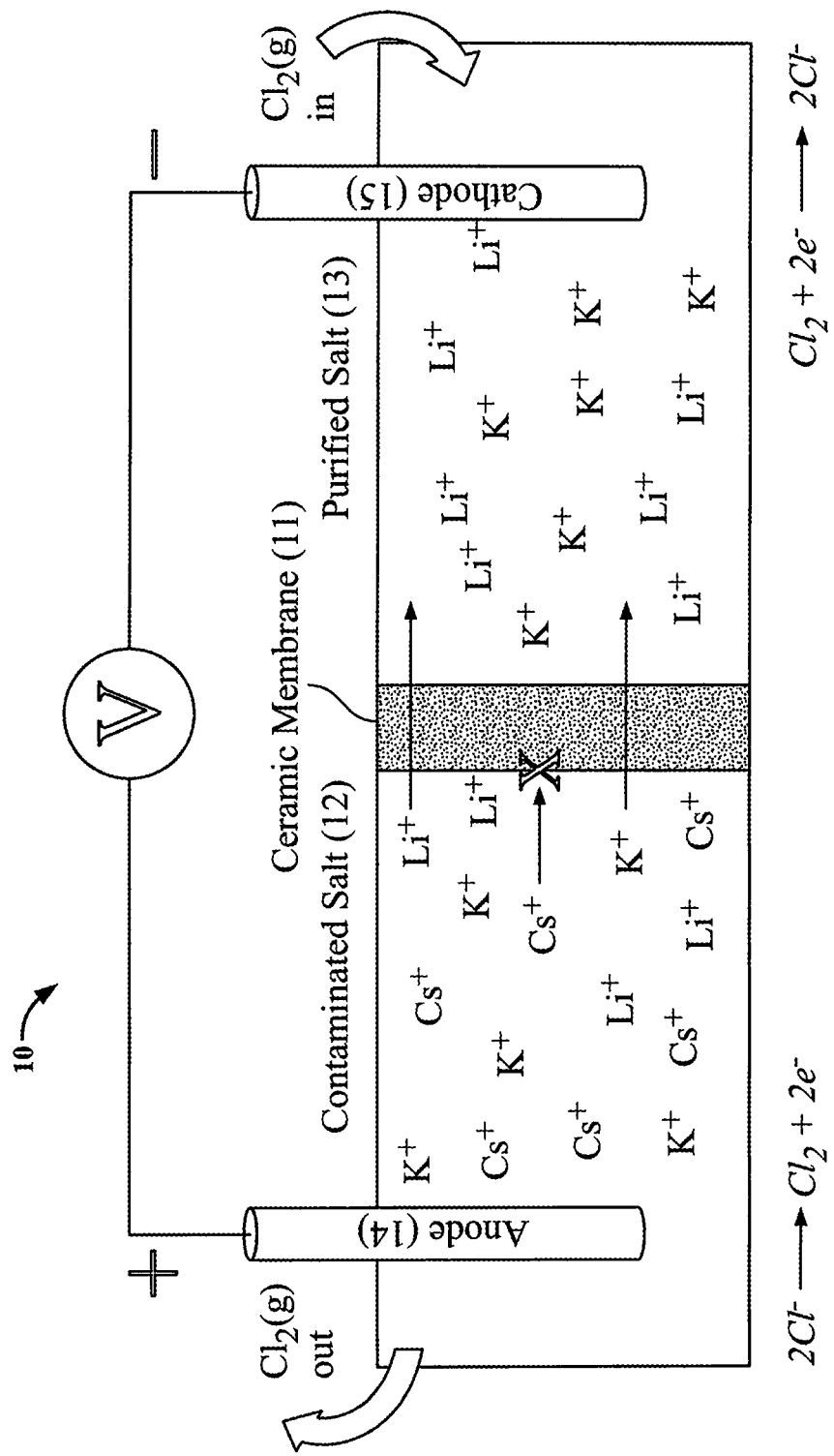
FIG. 2 is a schematic illustration of an electrochemical cell for electrochemical removal of $Cs^+$ from LiCl—KCl molten salt. Chloride ions in the molten salt have been omitted for clarity.

FIG. 2 schematically illustrates an exemplary electrochemical cell 10 for separating the contaminant $Cs^+$ from a LiCl—KCl molten salt. The cell 10 uses an electric field to move cations in a molten salt through an ion-selective ceramic membrane 11. Based on characteristics such as ionic radius or valence charge, the ceramic will selectively filter out the contaminants, allowing only purified cations of $Li^+$ or $K^+$ to pass through. This example relies primarily on size exclusion to separate $Cs^+$ from the $Li^+$ and $K^+$. To achieve this electrochemical separation, $Cs^+$-contaminated LiCl—KCl salt 12 is placed opposite purified LiCl—KCl electrolyte 13 and separated therefrom by the ion-selective ceramic membrane 11. Under an electrical bias applied between an anode 14 immersed in the contaminated salt 12 and a cathode 15 immersed in the purified salt 13, $Li^+$ and $K^+$ ions are transported across the ion-conducting ceramic membrane 11, while larger $Cs^+$ cations are excluded, effectively filtered and ultimately concentrated in the contaminated salt 12 on the anode-side of the cell 10. Ultimately, the resulting heavily $Cs^+$-enriched salt can be processed for disposal, but the volume of salt waste is dramatically reduced. This exemplary method takes specific advantage of the fact that the ionic radius of $Cs^+$ is significantly larger than either $Li^+$ or $K^+$ (i.e., $r_{Li}$=0.090 Å, $r_K$=1.52 Å, $r_{Cs}$=1.81 Å). To maintain charge balance on the anodic side of the cell, "excess" chloride ions in the molten salt can be electrochemically oxidized at the anode to form chlorine gas. Meanwhile, chlorine gas ($Cl_2$), ideally that produced at the anode, is bubbled into the cathode where it is reduced to chloride ions, balancing the influx of $K^+$ and $Li^+$ coming through the ceramic membrane.

Naturally, the properties of the ceramic separator will strongly influence the effectiveness of this method. In particular, the ceramic material preferably serves as a stable physical barrier between contaminated and purified salts at 500° C., is resistant to radiation exposure, is electrical insulating, and enables efficient, selective ion transport of $Li^+$ and $K^+$. The higher the ionic conductivity through the ceramic, the greater the ionic current through the cell and the faster the salt can be purified. The greater the selectivity of the ceramic, the higher the purity of the recycled salts. As described below, NaSICON-type ceramics and garnet-structured lithium lanthanum tantalates are especially attractive ceramics that can provide both efficiency and selectivity.

NaSICON-Type Ceramics

Figure 3B:
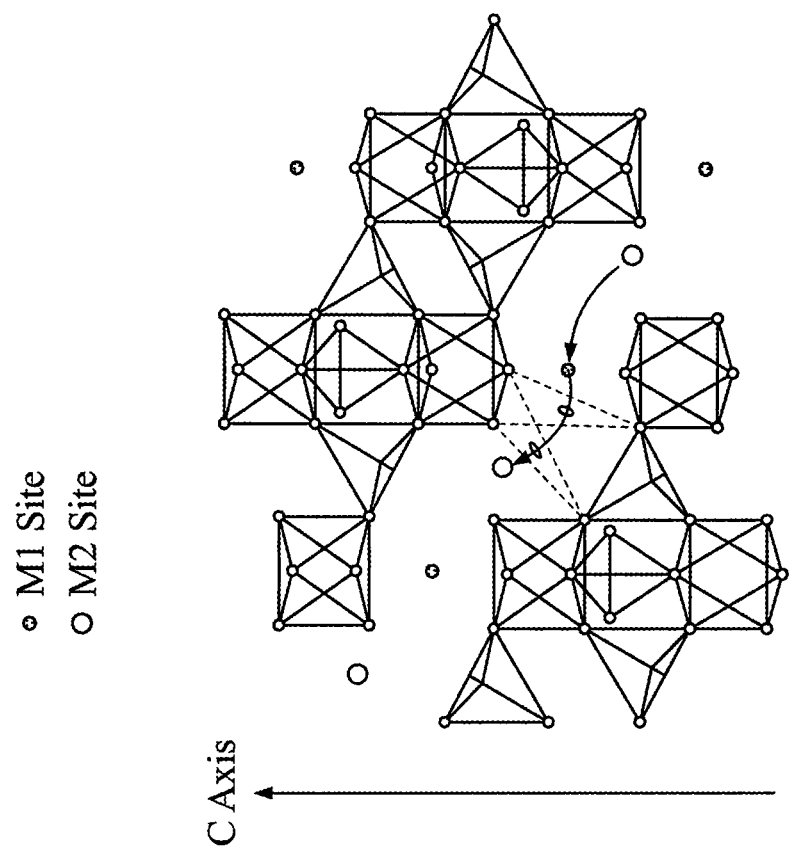
FIG. 3B is a schematic view of the NaSICON structure showing a pathway for ion conduction.
Figure 3A:
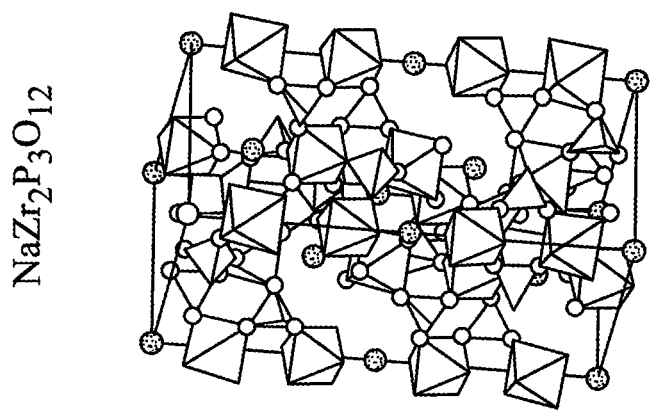
FIG. 3A is an illustration of the molecular structure of $NaZr_2P_3O_{12}$ showing zirconia octahedra, phosphate tetrahedra, oxygen (small spheres), and sodium (large spheres).

The term NaSICON (Na Super Ion CONductor) commonly refers to the ion-conducting ceramic $Na_{1+x}Zr_2Si_xP_{3-x}O_{12}$, but more generally belongs to a family of compounds with the basic formula $[M^I_1][M^{II}_2][A^{VI}_2][B^{IV}_3]O_{12}$ (most often designated as $M_xZr_2(PO_4)_3$, where M is typically an alkali cation). As shown in FIG. 3A, these materials form a rigid hexagonal framework of corner-linked $ZrO_6$ octahedra and $PO_4$ tetrahedra and containing so-called M1 and M2 interstitial positions, typically filled with alkali cations such as sodium. See M. Cretin et al., *Sensors and Actuators B* 43, 224 (1997). As shown in FIG. 3B, the conduction of alkali cations through NaSICON-type materials is based on the movement of the ion from site to site through the crystal lattice via channels (bottlenecks) constricted by zirconia octahedra and phosphate tetrahedra. As a result, ion conductivity through this matrix depends strongly on both the size of these conduction channels and the size of the mobile cation. See D. Bykov et al., *Sol. St. Ionics* 182, 47 (2011).

Figure 4:
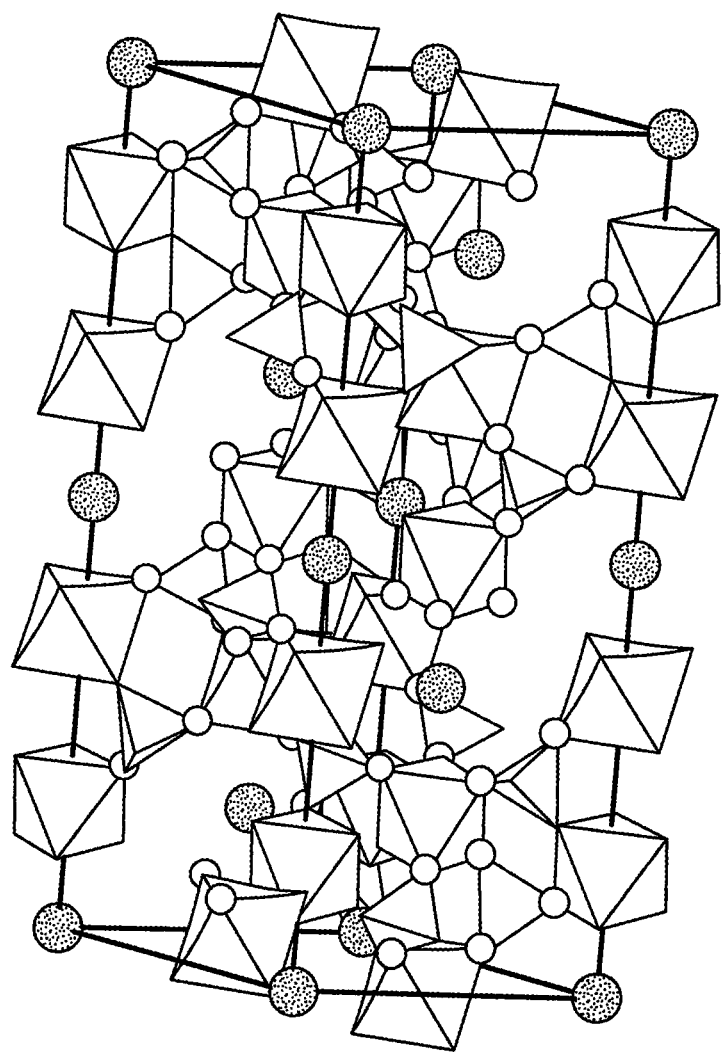
FIG. 4 is an illustration of the molecular structure of KSICON ($KZr_2(PO_4)_3$) showing zirconia octahedra, phosphate tetrahedra, oxygen (small spheres), and potassium (large spheres). Substitution of $K^+$ for $Na^+$ in the lattice produces an expansion of the c-axis and a contraction of the a-axis.

As shown in FIG. 4, the present invention provides as an example material a potassium-substituted NaSICON variant, KSICON ($KZr_2(PO_4)_3$). Because $K^+$ is larger than $Na^+$ ($r_K$=1.52 Å, $r_{Na}$=1.16 Å), forcing transport of $K^+$ ions through a sodium-based NaSICON structure would have required a lattice expansion "in situ," a process that could be detrimental to the structure and integrity of the ceramic. By synthesizing the lattice with potassium already in place, the lattice is created "ready" to accommodate $K^+$ for ion transport. Transport of the much smaller $Li^+$ does not pose any steric problems in this lattice. In contrast, steric hindrance can severely limit transport of the larger $Cs^+$ cation ($r_{Cs}$=1.81 Å) through the lattice. Ultimately, this ceramic ion conductor allows facile ion transport of $Li^+$ and $K^+$, but prevents transport of $Cs^+$, providing the ion selectivity desired to realize the electrochemical ion separation scheme shown in FIG. 2.

In addition to alkali cation substitution to create KSICON, ion selectivity can be further tuned through modifications to the zirconia octahedra and the phosphorus tetrahedra to vary the shape of the ion transport pathways. For example, partial substitution of silicon for phosphorus in NaSICON produces a notable increase in sodium conductivity, in large part by changing the shape of the tetrahedral side of the ion channel bottleneck. See O. Bohnke et al., *Sol. St. Ionics* 122, 127 (1999).

LLTO-Type Ceramics

Figure 5B:
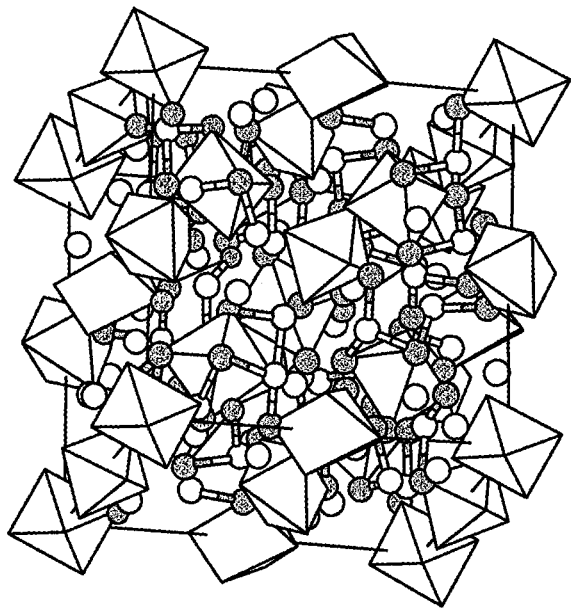
FIGS. 5A and 5B are illustrations of the molecular structure of $Li_5La_3Ta_2O_{12}$ showing Ta octahedra, oxygen, La, and Li. The structure in FIG. 5A shows Li in octahedral coordination, while the structure in FIG. 5B shows tetrahedrally-coordinated Li.
Figure 5A:
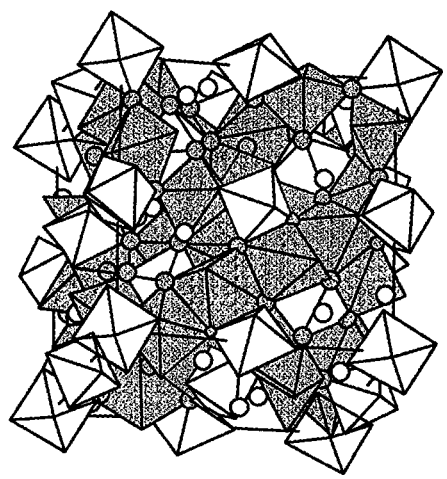

Garnet-structured lithium lanthanum tantalate ceramics (Lithium Lanthanum Tantalate or LLTO), shown in FIGS. 5A and 5B, have recently been shown to possess high ionic conductivities with stability against facile reduction of the constituent ions. See J. Awaka et al., *Sol. St. Ionics* 180, 602 (2009); J. Ihlefeld et al., *Adv. Mater.* 23, 5663 (2011); and V. Thangadurai and W. Weppner, *Adv. Funct. Mater.* 15, 107 (2005). Lithium ions in $Li_5La_3Ta_2O_{12}$ and related materials move within a three-dimensional network of energetically equivalent partially occupied sites. Lithium is both octahedrally and tetrahedrally coordinated in this lattice, and ion conduction is possible along both sites, though it is believed that transport along the octahedral sites is more favorable.

As a known lithium ion conductor, this material is naturally suitable for $Li^+$ transport. According to the present invention, the crystal growth can be modified to accommodate $K^+$ transport as well (while excluding $Cs^+$ transport). As in the NaSICON modification described above, this involves expansion of the crystal lattice and, consequently, ion channel size via substitution of lanthanum with combinations of alkali and alkali-earth ions. It has been shown that by expanding the lattice parameter (e.g., through substitution of $Ba^{2+}$ (r=1.49 Å) for $La^{3+}$ (r=1.174 Å)) the polyhedra expand and conduction via tetragonal sites as well as octahedral sites becomes more favorable. See J. Ihlefeld et al., *Adv. Mater.* 23, 5663 (2011); and V. Thangadurai and W. Weppner, *Adv. Funct. Mater.* 15, 107 (2005). The low occupation of lithium in the polyhedra means that a hop to a neighboring site has greater than 50% probability of occurring.

Material Syntheses and Processing

To demonstrate the invention, ion-conducting ceramics were synthesized utilizing primarily solid-state synthetic techniques, tailoring the chemistry to accommodate variations in material composition and crystal structure. All chemistries described below utilize surrogate ions.

NaSICON-Type Ceramics

The reagents used for solid state synthesis of a variety of NaSICON-type powders included sodium phosphates ($NaH_2PO_4$ or $Na_2HPO_4$) potassium phosphate salts ($KH_2PO_4$ or $K_2HPO_4$) zirconium oxide ($ZrO_2$), and phosphorus pentoxide ($P_2O_5$). Stoichiometric quantities of target reagents were combined in a mortar and pestle with hexanes, limiting or eliminating exposure to moisture. Solvent was allowed to evaporate and the resulting powder was calcined at 500-800° C. in an alumina crucible. The resulting hard, glassy solid was removed from the crucible and ball-milled with $ZrO_2$ media in hexanes overnight. The milled powder was collected, dried at 60° C., and then combined with 2.5 wt % propylene carbonate binder in acetone before uniaxial pressing at 10,000 psi in a 0.25 inch diameter steel die. Pellets were placed on a bed of mother powder and fired to 1000-1100° C. for 12 hours in static air (ramp rate of 5° C./min). During heating, a 4 hour hold at 400° C. was used to ensure effective binder burnout before reaching the elevated sintering temperatures. Pellets were slowly cooled to room temperature. Powder samples were similarly prepared, but were not mixed with binder or pressed into pellets.

LLTO-Type Ceramics

Ceramic test specimens of LLTO-based garnet phases were prepared using solid-state ceramic synthesis techniques. Starting materials were lithium carbonate, lanthanum oxide, tantalum oxide, and barium carbonate. The powders were combined and mixed by ball milling with $ZrO_2$ media in hexane for 24 hours. The hexane was then evaporated from the combined powders using a rotary evaporator to minimize segregation. Powders were then calcined in closed crucibles at 1000° C. for 6 hours to decompose the carbonate precursors and to react the oxides to form the LBLTO compounds. The calcined powders were subsequently milled in hexane for 24 hours to break-up sintered and agglomerated particles. After evaporating the hexane liquid, the powders were combined with 3 wt % poly vinyl butyrol and ethanol binder and pressed into 0.5 inch diameter pellets under a uniaxial pressure of 10,000 psi. The pellets were then isostatically pressed under a pressure of 22,000 psi. Pellets were sintered into ceramic monoliths by burying in the mother powder to minimize lithium volatilization and firing to 1050° C. in air for 6 hours using 5° C./min temperature ramps. A 500° C., 3 hour rest was utilized on the increasing temperature ramp to remove the binder from the samples prior to densification.

Materials Characterization

The morphology, chemistry, and crystal structure of synthesized materials, both in powder form and as sintered pellets, were characterized before evaluating the ion-transport and molten salt stability of these compounds.

Structural Characterization

To investigate ceramic microstructure, morphology and qualitative chemical composition, platinum-coated samples were examined in a Zeiss Supra™ 55VP scanning electron microscope (SEM) at 10 keV, fitted with an Oxford X-Max energy dispersive x-ray spectroscopy (EDXS) detector and AZtec® software. Crystallography of ion-conducting materials was evaluated by x-ray diffraction (XRD), performed on both powder samples and ceramic pellets using a Panalytical X'Pert Pro powder diffractometer or a Siemens D500 theta/theta diffractometer (Cu Kα radiation).

Molten Salt Stability

Sintered ceramic pellets of NaSICON, KSICON and LBLTO were prewarmed and immersed in eutectic molten salts of KCl—LiCl (56-44 wt %) and KCl—LiCl—CsCl (18-25-57 wt %) to evaluate ceramic stability. The binary KCl—LiCl melt temperature is ~355° C., but that temperature decreases with increasing CsCl content, becoming as low as 260° C. with 29 mol % (57 wt %) CsCl.

Initial stability tests were performed in an Ar glove box, immersing test pellets into eutectic KCl—LiCl molten salt for 30 minutes at 500° C. The eutectic salts were melted in a glass test tube and heated in a custom resistive heater. Temperature in the molten salt was monitored using a pyrex-coated type K thermocouple. After 30 minutes of exposure, the samples were cooled and the molten salt was removed either manually or with aqueous washing.

The ternary immersion tests were performed in a dry $N_2$ purged glove box. Inside this glove box, glass vials containing the salts of a desired salt composition were fitted into a chambered aluminum block that was heated on a hot plate. A type J thermocouple, inserted into the block, was used to monitor temperature and maintain a temperature of 400° C. inside the aluminum block (400° C. was the maximum temperature achievable with this heating configuration).

At specific intervals, samples were allowed to cool and the pellets were removed from the solidified molten salt either manually or with aqueous washing. Select pellets were either examined by XRD to determine any changes in the crystal structure during molten salt exposure. Other pellets were fractured after exposure to reveal cross-sections of the ceramic interior for SEM and EDXS analysis of ceramic morphology and chemistry.

Higher temperature testing for stability in LiCl molten salts was performed by burying LBLTO ceramics in LiCl powder inside a glass container (vial). The sample was heated to 650° C. under flowing $N_2$ and held for 4 hours. After slowly cooling to room temperature, the pellet was removed from the molten salt and examined by SEM/EDXS.

Impedance Spectroscopy

Gold blocking electrodes were sputter deposited onto the parallel faces of the 0.25-inch diameter KSICON pellets to enable impedance measurements. Impedance data were collected using an Agilent 4284A instrument at room temperature. An oscillator voltage of 20 mV rms was applied over a frequency range from 1 kHz to 1 MHz and the absolute impedance and phase angle measured.

High Temperature Electrochemical Characterization

Figure 6A:
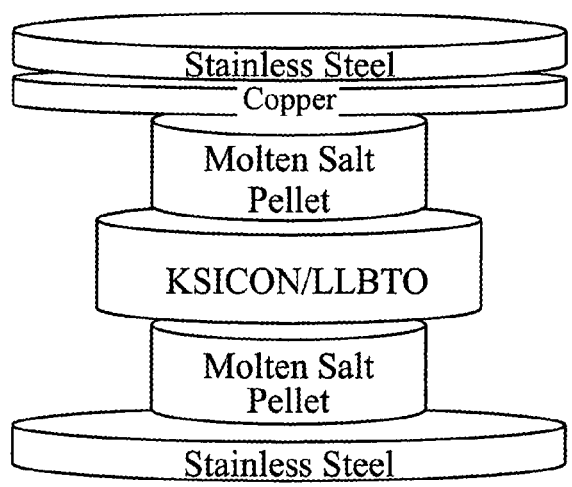
FIG. 6A is a side-view schematic illustration of an assembled electrochemical pellet stack. An ion conducting membrane separates two different molten salt electrolyte binder pellets. A copper anode and stainless steel current collectors cap the assembly.
Figure 6B:
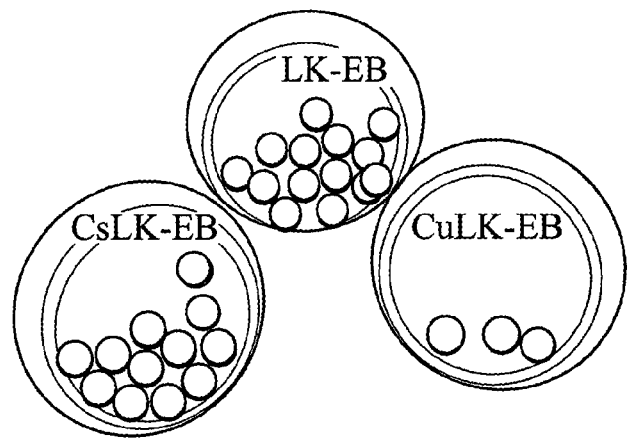
FIG. 6B is a photograph of the pellets.
Figure 6C:
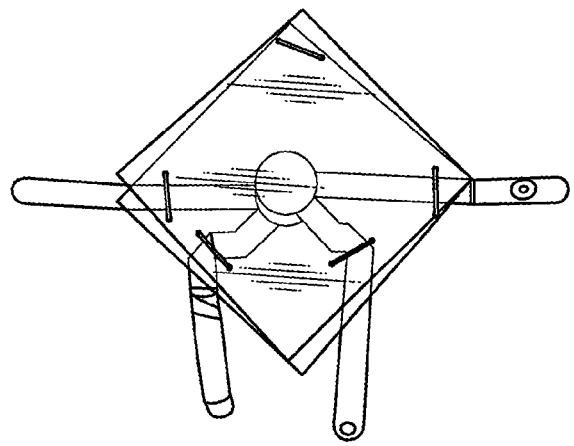
FIG. 6C is a top-view photograph of the assembled device, sandwiched between two pieces of mica, that is connected to electrical leads before placed between heated platens and tested electrochemically.

The high temperature electrochemical behavior of the ceramics was determined using "pellet stacks," configured as shown schematically in FIG. 6A. These stacks were composed of molten salt pellets, an ion-conducting ceramic, a copper anode, and stainless steel current collectors. FIGS. 6B and 6C show the molten salt pellets, also known as electrolyte binder (EB) pellets, and an assembled device structure, respectively. Molten salt pellets were 11 mm diameter, while KSICON pellets were typically 13.3 mm in diameter and 2.9 mm thick, and LBLTO pellets were typically 15.6 mm in diameter and 3.2 mm thick. The assembled structures were sandwiched between carefully stapled sheets of mica to help hold the stacks together (until heated) and to electrically insulate the structure from the platens used to heat the stacks.

Figure 7:
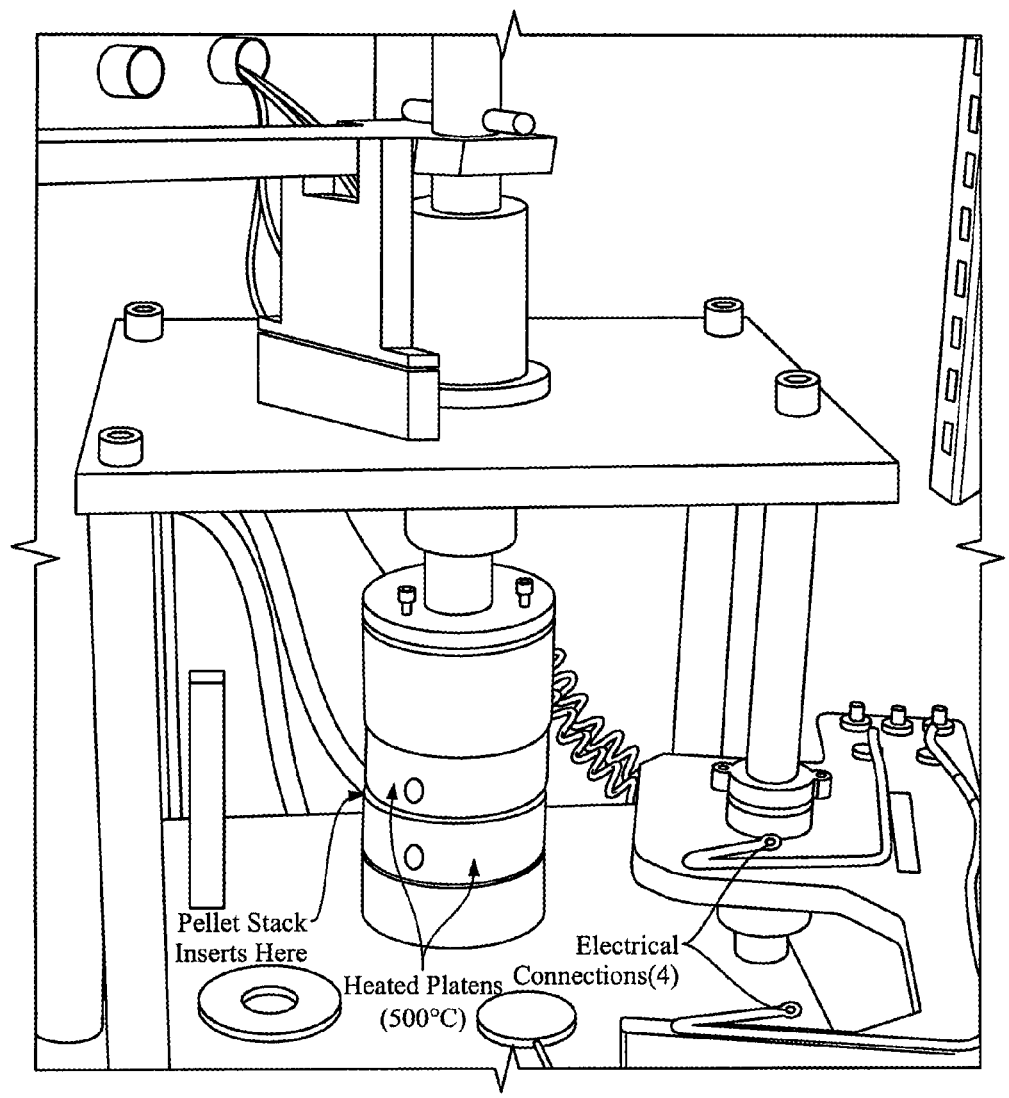
FIG. 7. is a photograph of a high temperature electrochemical test platform (inside Ar glove box). Current collectors attached to the molten salt/ceramic pellet stacks (not shown) were connected to 4 electrical leads, and the assembly was inserted between two platens heated to 500° C.

To protect the integrity of the molten salt pellets, stack assembly was performed in a dry room and placed in an Ar-glove box for electrochemical evaluation. Inside the glove box, the four current-collector tabs were connected to a Solartron SI 1287 electrochemical interface for 4-point electrochemical measurements, and the pellet stack was placed between two platens heated to 500° C., as shown in FIG. 7. Platen temperature was monitored by thermocouples built into the platens. Once the EB pellets were molten, ensuring good contact between the layers of the stacks, high temperature impedance measurements and galvanostatic discharge experiments were performed to evaluate the preliminary ion-transport properties of these systems.

Table 1 identifies several phases that were targeted for synthesis and briefly summarizes the results of the synthesis. In particular, $KZr_2P_3O_{12}$ (KSICON) and $Li_6BaLa_2Ta_2O_{12}$ (LBLTO) ceramics were readily synthesized and exhibited the crystal chemistry preferred for removal of $Cs^+$ from LiCl—KCl molten salts. Refinement of the chemistry and processing of the other phases, however, is possible and may provide improved ceramic properties. In addition, commercially-available NaSICON-based ceramics, such as those produced by Ceramatec, Inc., may be suitable for this application.

TABLE 1

Compositions of targeted ion conducting ceramics and the results of attempted syntheses.

| Target Compound | Synthetic Outcome* |
|---|---|
| $NaZr_2P_3O_{12}$ | Single phase NaSICON |
| $Na_3Zr_2Si_2PO_{12}$ | NaSICON with minor $ZrO_2$ contaminant |
| $KZr_2P_3O_{12}$ | Single phase KSICON |
| $Li_5La_3Ta_2O_{12}$ | Single phase LLTO |
| $Li_6BaLa_2Ta_2O_{12}$ | LBLTO with minor $Ba_2LaTaO_4$ phase |
| $K_5La_3Ta_2O_{12}$ | Multiple phases |
| $Na_5La_3Ta_2O_{12}$ | Multiple phases |
| $K_3Zr_2Si_2PO_{12}$ | Multiple phases |
| $K_3Zr_2Si_2PO_{12}$ | Multiple phases |

*"Single phase" indicates a single phase evident by x-ray diffraction

KSICON

Crystallography

Figure 8:
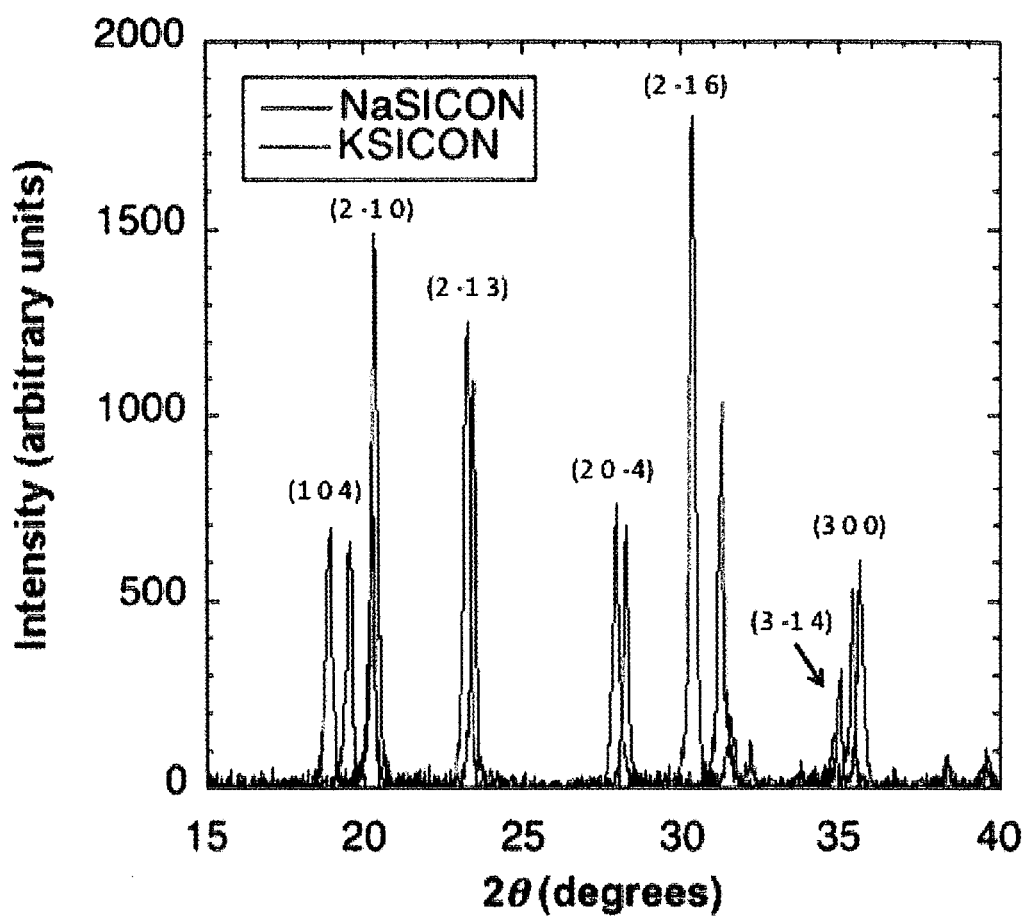
FIG. 8 is a graph of the X-ray diffraction patterns for NaSICON ($NaZr_2P_3O_{12}$) and KSICON ($KZr_2P_3O_{12}$). (h k l) indices are provided for the major peaks. Lattice shifts show c-axis expansion and a-axis contraction in the KSICON material.

Solid-state synthesis of both KSICON and NaSICON at 1100° C. produced white ceramic powders (or pellets) that appeared as single phase by x-ray diffraction, as shown in FIG. 8. Comparing the diffraction pattern for KSICON with that of the sodium-version of this crystal structure reveals a significant difference in lattice parameters between these two materials. There is a notable expansion of the crystallographic c-axis, coincident with a slightly less significant contraction of the a-axis (i.e., $c_{NaSICON}$=22.746 Å, $c_{KSICON}$=23.890 Å; $a_{NaSICON}$=8.815 Å, $a_{KSICON}$=8.710 Å). If the standard sodium-filled NaSICON were used to conduct potassium ions from the molten salt, these data indicate that the lattice would have to undergo considerable rearrangement in situ to accommodate the $K^+$. Either resistance to this rearrangement would prevent $K^+$ transport, or the rearrangement itself would degrade the integrity of the bulk ceramic separator. Furthermore, it is reasonable to infer that a similar in situ lattice expansion to accommodate the still larger $Cs^+$ ions would provide an even greater energetic deterrent to $Cs^+$ transport, thus providing the desired ion selectivity.

KSICON Stability in Molten Salt

The use of these ceramics in electrochemically purifying molten salts requires ceramic stability against molten salts at elevated temperatures. To verify this stability, KSICON ceramic pellets (preheated) were immersed in a LiCl—KCl—CsCl eutectic molten salt at 400° C. for 30 and 60 minute exposures. Relatively low density pellets (~60% theoretical density) were used to most effectively probe the interactions between the salt and the ceramic matrix (i.e., by providing higher ceramic surface area exposure to molten salt). Visually, the pellets were unchanged during their immersion (with some bubbling as the molten salt infused the pellet), and they remained physically intact after cooling and removal of the molten salt caked around the pellet. X-ray diffraction data confirmed retention of the KSICON phase, though there was significant evidence of chloride salts present in the material. In agreement with these data, EDXS data collected from pellet cross-sections in the SEM qualitatively indicated that the crystal chemistry remained unchanged, and further revealed significant molten salt infiltration as suggested by the XRD data. The ceramic microstructure appeared otherwise unaffected by the interaction with the molten salt. The effective infiltration of the molten salt also indicates good interfacial wetting at the ceramic-salt interface, an important consideration for efficient ion transport in the purification cell.

Passive KSICON Ion Selectivity

Figure 9:
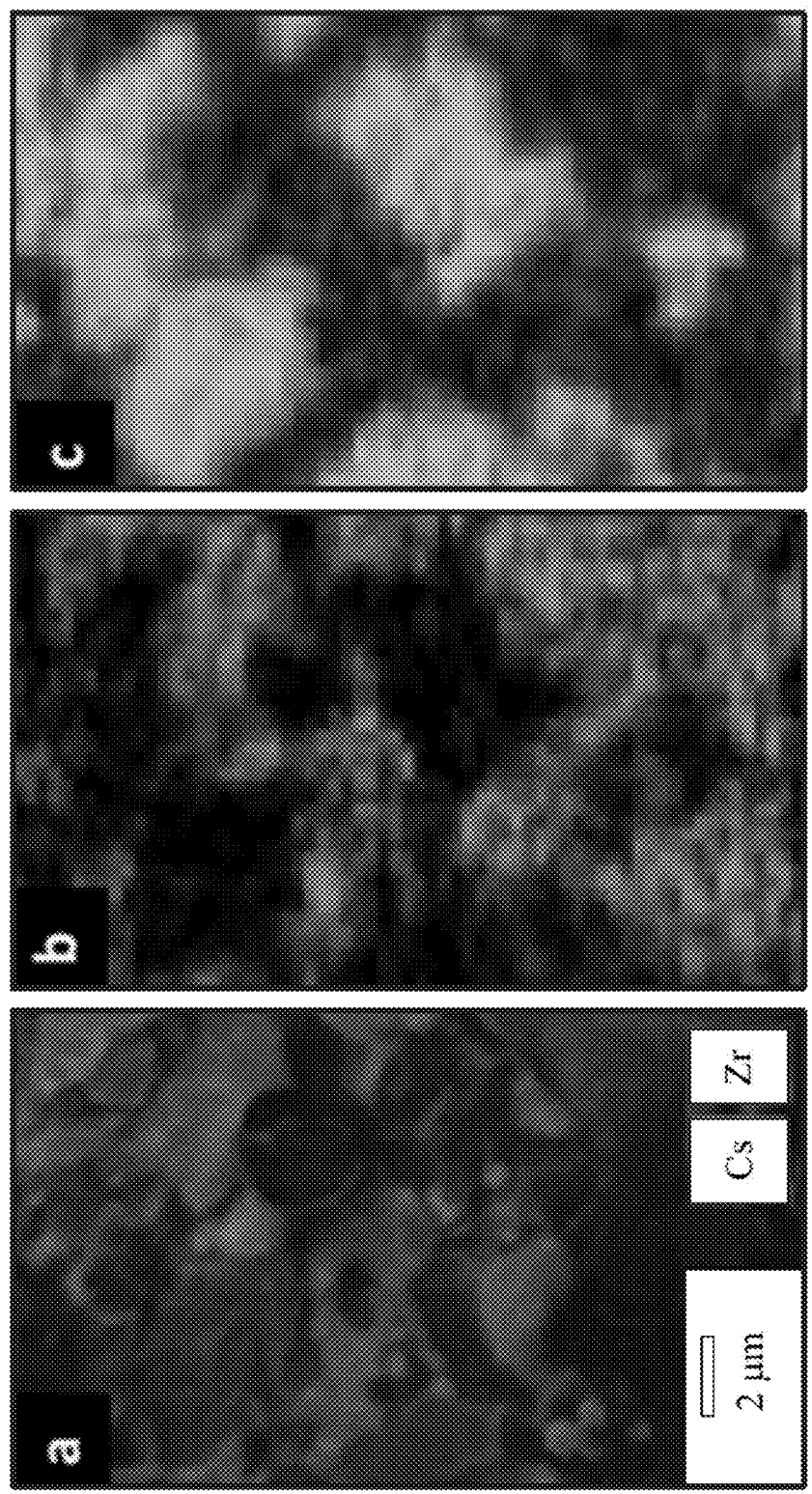
FIG. 9A-9C show EDXS spectral maps of KSICON ceramic, infiltrated with LiCl—KCl—CsCl molten salt.

The EDXS data also provides insight into the selectivity of these ion conductors against $Cs^+$ ions. FIGS. 9A-9C show elemental mappings of a local region of salt-infiltrated KSICON. The composite map in FIG. 9A overlays the spectral map for Cs in the molten salt and Zr in the KSICON while FIGS. 9B and 9C show these spectra separately. The maps show KSICON domains surrounded by domains of salt, but the interfaces between these different phases remain sharp; there is no indication of Cs diffusion into the KSICON domains. These data represent evidence that the KSICON ceramic is stable in the LiCl—KCl—CsCl molten salt at elevated temperatures, and that the ion conductor is selective against significant Cs transport.

Room Temperature Impedance Spectroscopy of KSICON

Figure 10:
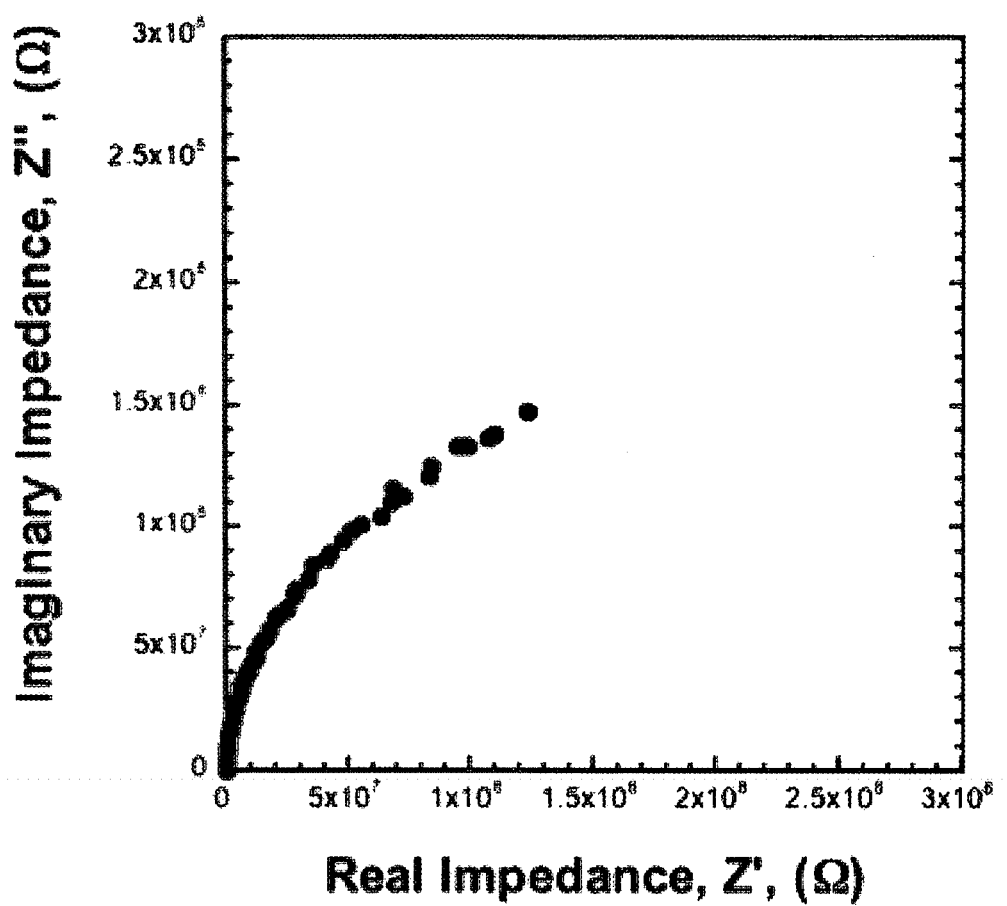
FIG. 10 is a graph of imaginary versus real impedance collected from KSICON at room temperature.

KSICON pellets were coated with gold electrodes to determine room temperature ionic conductivity using electrochemical impedance spectroscopy (EIS). FIG. 10 is a plot of the imaginary versus real impedance for KSICON collected at room temperature. The high frequency (1 MHz) real portion of impedance was attributed to potassium-ion conductivity within the grains of the material. See R. W. Powers and S. P. Mitoff, *J. Electrochem. Soc.* 122, 226 (1975). This value was used to calculate an approximate grain conductivity of $2 \times 10^{-4}$ S/cm (three samples tested), a value comparable to lattice sodium conductivity values in comparable NaSICON materials. See O. Bohnke et al., *Sol. St. Ionics* 122, 127 (1999). Ultimately, however, these room temperature blocking electrode measurements provide only limited insight into the ion transport properties desired for electrochemical waste separation. They account for only potassium conductivity, and they cannot account for changes in ionic mobility of the system at higher temperature. The high temperature EIS and galvanic discharge experiments described below provide a better picture of the ionic conductivity.

LBLTO

Crystallography

Solid-state synthesis of the LBLTO garnet phase at 1050° C. produced white ceramic pellets with geometric densities of ~84% of theoretical density. X-ray diffraction revealed the expected LBLTO garnet phase with a minor $Ba_2LaTaO_4$ second phase, likely produced because of lithium deficiency (either through volatility during sintering or batching deficiency of hygroscopic precursors). Thermogravimetric analysis of the starting powders was used to identify the actual starting masses of the constituent powders to correct this problem in subsequent batches. Comparison of the lattice parameters of the Ba-containing and non-Ba-containing compositions revealed that the inclusion of $Ba^{2+}$ did result in an increased lattice parameter.

FIG. 11A shows the x-ray diffraction pattern for LBLTO, compared with the calculated pattern for the non-barium containing $Li_5La_3Ta_2O_{12}$ phase. These data show that the partial substitution of the larger $Ba^{2+}$ for $La^{2+}$ did increase the lattice parameter from 12.829 Å to 12.936 Å. FIG. 11B shows the predicted variation of lattice parameter as a function of $Ba^{2+}$ substitution, with the partially Ba-substituted compound ($Li_{5.6}Ba_{0.6}La_{2.4}Ta_2O_{12}$) indicated by the green data point. The evident expansion of the crystal lattice not only stands to increase the conductivity of $Li^+$ in these materials, but may accommodate the transport of $K^+$ ions as well. Importantly, FIG. 11B shows that the lattice can be tuned as a function of $Ba^{2+}$ content, allowing for refinement and optimization of ion selectivity.

LBLTO Behavior in Molten Salt

The stability of LBLTO ceramic pellets was evaluated by immersing preheated pellets in LiCl—KCl eutectic molten salt at 500° C. for 30 minutes, LiCl—KCl—CsCl eutectic molten salt at 400° C. for 60 minutes, and molten LiCl at 650° C. for 4 hours. Visually, the pellets were unchanged both during their immersion and after removal from each of these salt treatments, as shown in FIG. 12A.

Figure 12B:
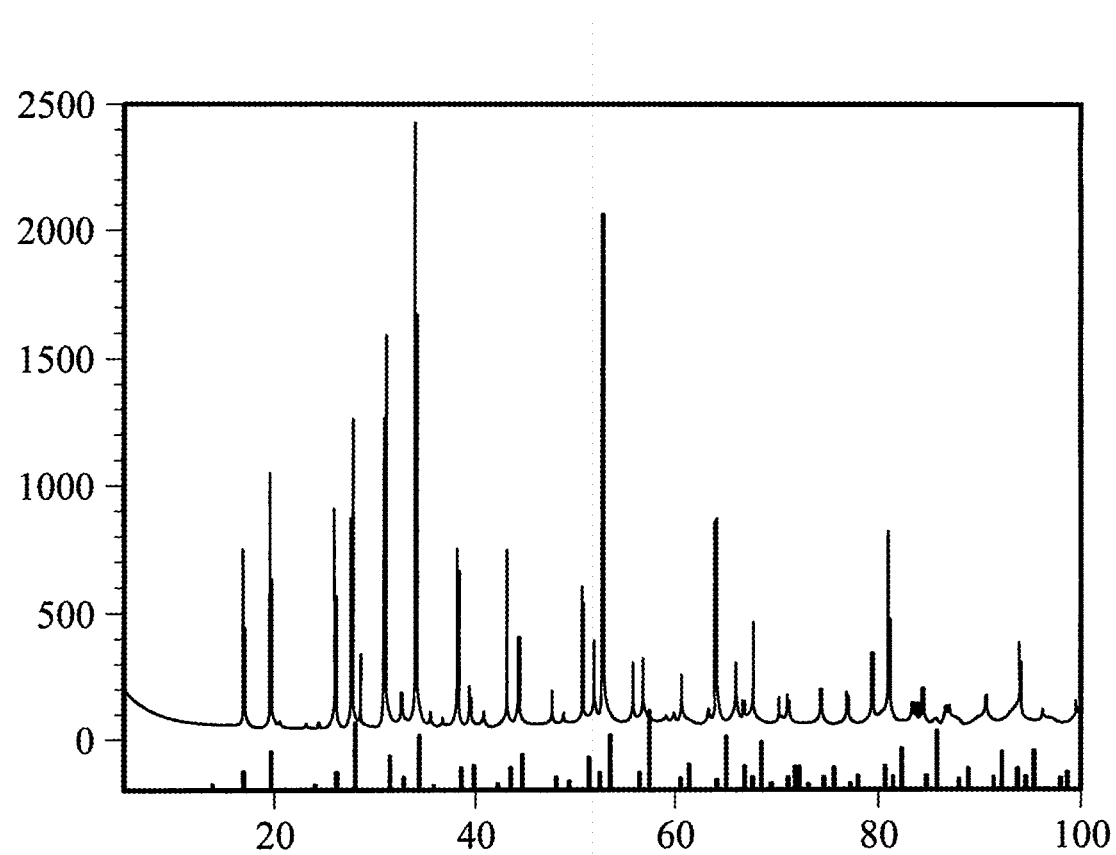
FIG. 12B is a graph of the X-ray diffraction of exposed pellet, indicating no changes in crystal structure during 30 minute exposure (compared with FIG. 11A above). *There is a small amount of residual KCl evident in the diffraction spectrum.

Comparison of x-ray diffraction patterns collected from the pellets before and after exposure to the eutectic salt compositions revealed no measurable change in the lattice parameters or crystal phase, as shown in FIG. 12B. In addition, EDXS data collected from pellet cross-sections in the SEM qualitatively indicate that the crystal chemistry remained unchanged. These tests indicate stability of the LBLTO ceramic against LiCl—KCl molten salts at 500° C. or LiCl—KCl—CsCl eutectic molten salt at 400° C.

Figure 13:
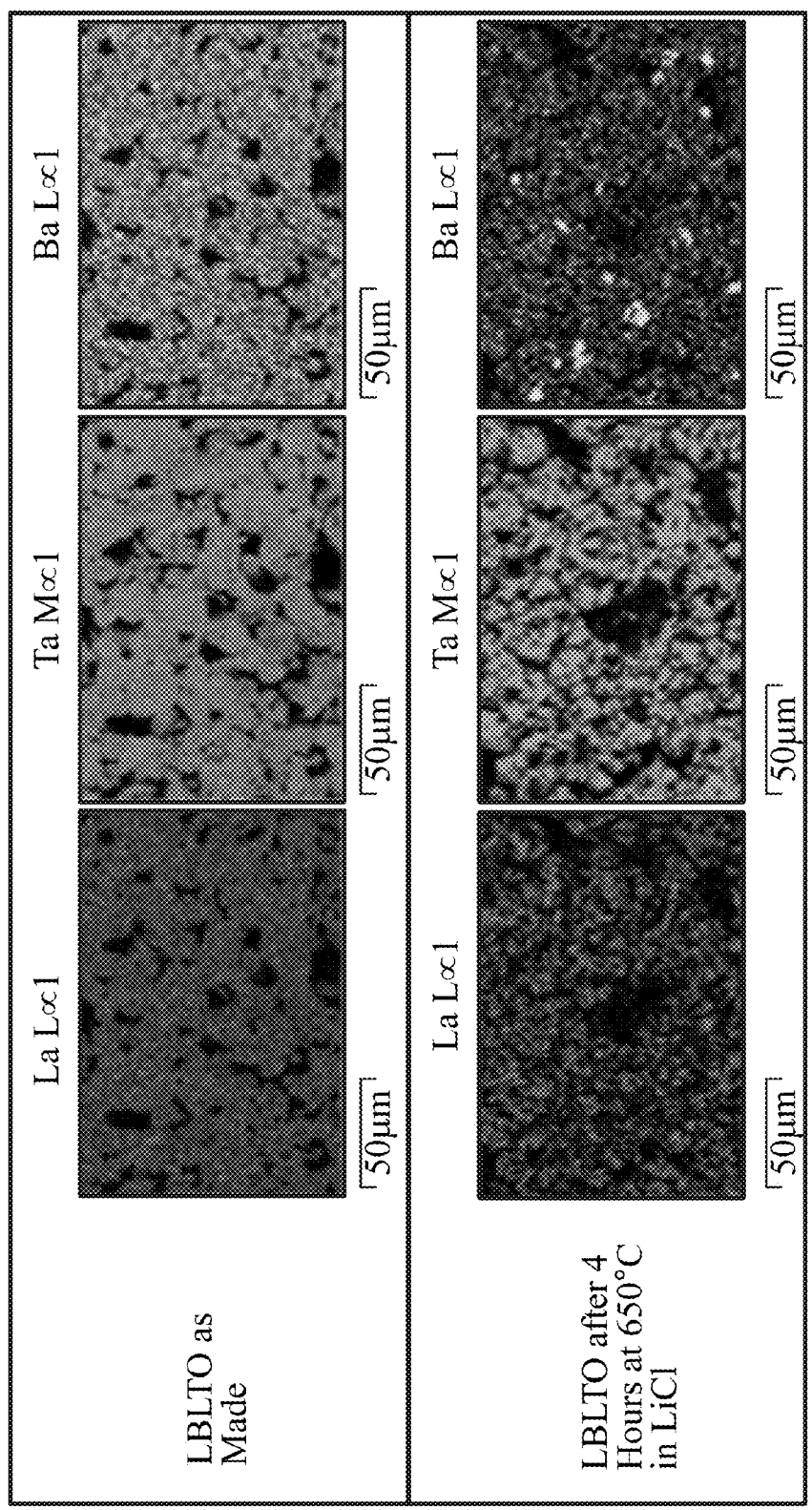
FIG. 13 show EDXS maps of LBLTO pellets as made (above) and after immersion in molten LiCl at 650° C. for 4 hours (variation in sample texture is due to sample preparation). As made, La (magenta), Ta (green), and Ba (yellow) appear uniformly distributed throughout the grain structure of the ceramic. After LiCl treatment, La and Ta remain uniformly distributed, but segregated regions of high Ba content appear.

When cross-sections of samples exposed to LiCl at 650° C. for 4 hours were examined in the SEM, EDXS data indicated the formation of minor $BaCl_2$ inclusions within the structure. As seen in the elemental maps in FIG. 13, LBLTO examined before high temperature exposure to LiCl showed uniform distribution of La, Ta, and Ba. After exposure, however, La and Ta remained uniformly distributed, but there was evidence of Ba segregation (likely as $BaCl_2$), indicated by the emergence of bright yellow spots in the lower right map of FIG. 13. These data suggest that at this elevated temperature, a fraction of $Ba^{2+}$ cations become sufficiently mobile to escape the LLTO lattice, forming secondary inclusions in the material. The remainder of the ceramic composition appeared unchanged.

For purification of LiCl—KCl molten salts, the addition of $Ba^{2+}$ to the LLTO lattice is intended to keep the crystal structure sufficiently expanded to allow for $K^+$ transport as well as $Li^+$ transport. At the lower temperatures (e.g., 500° C.), required for this process, the $Ba^{2+}$ appears to be much more stable, based on XRD data (above) and EDXS analysis (not shown). For purification of LiCl, however, the mobility of $Ba^{2+}$ at elevated temperatures (650° C.) suggests that unmodified LLTO (no $Ba^{2+}$) may be a more appropriate ion conductor. Since there is no need to transport $K^+$ in such a system, the absence of the lattice expanding $Ba^{2+}$ is not expected to pose a problem.

Passive Ion Selectivity in LBLTO

Figure 14A:
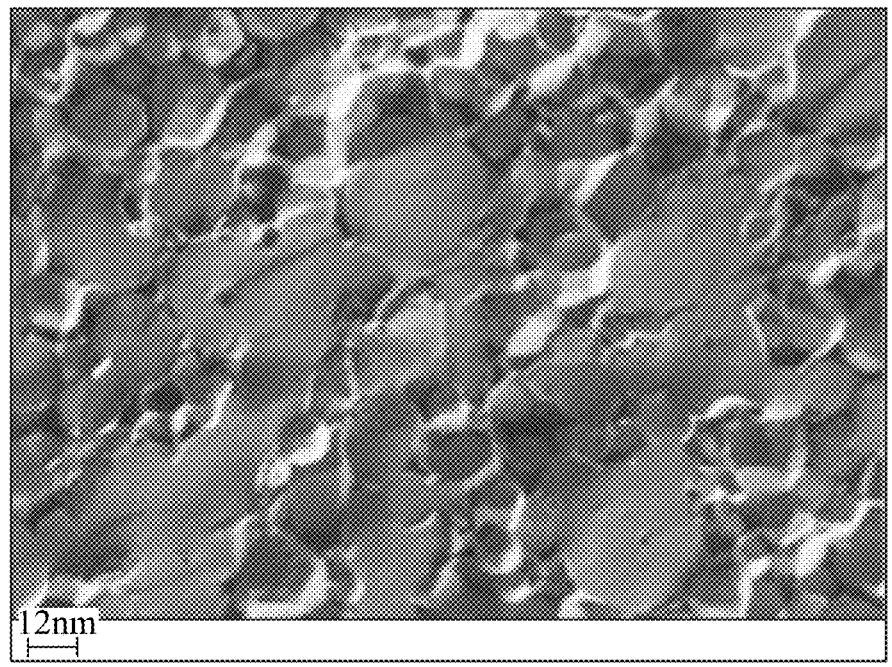
FIG. 14A is an SEM micrograph of LBLTO ceramic microstructure.
Figure 14B:
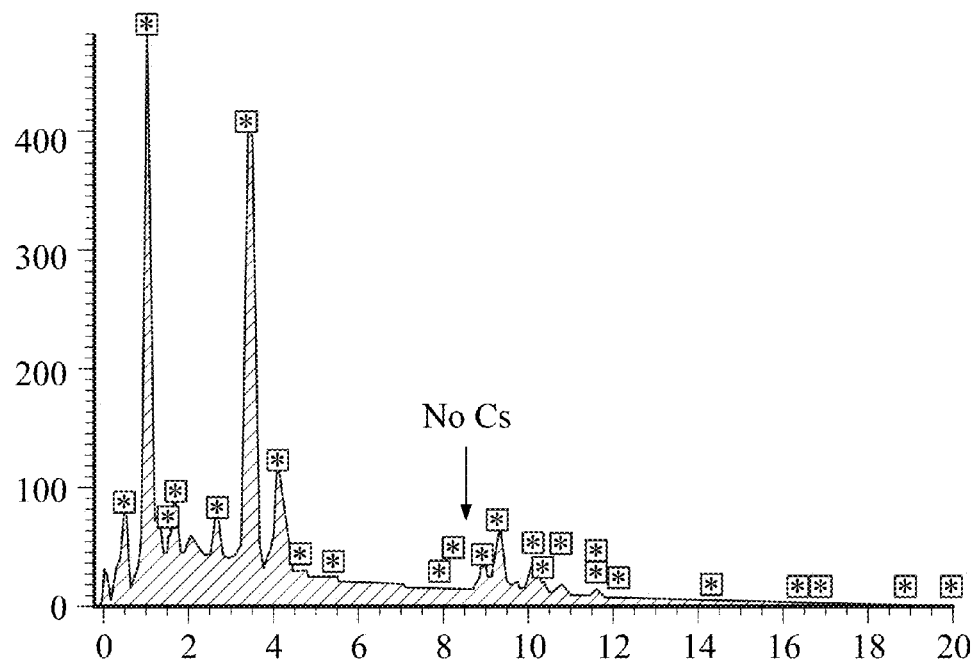
FIG. 14B is an EDXS spectrum from LBLTO after exposure to LiCl—KCl—CsCl molten salt for 60 minutes at 400° C.

LBLTO samples were also immersed in LiCl—KCl—CsCl eutectic molten salt for 60 minutes at 400° C. to probe both stability and passive ion selectivity (against $Cs^+$). FIG. 14A shows an electron micrograph and FIG. 14B shows an EDXS spectrum from a cross-section of a pellet after salt exposure. The microstructure appears intact and the EDXS data show, qualitatively, that the LBLTO chemical composition was preserved. Importantly, there is no evidence of Cs⁺ in the EDXS spectrum, suggesting that not only is the material stable against the molten salt, but it is selective against Cs⁺ transport.

Room Temperature Impedance of LBLTO

Figure 15:
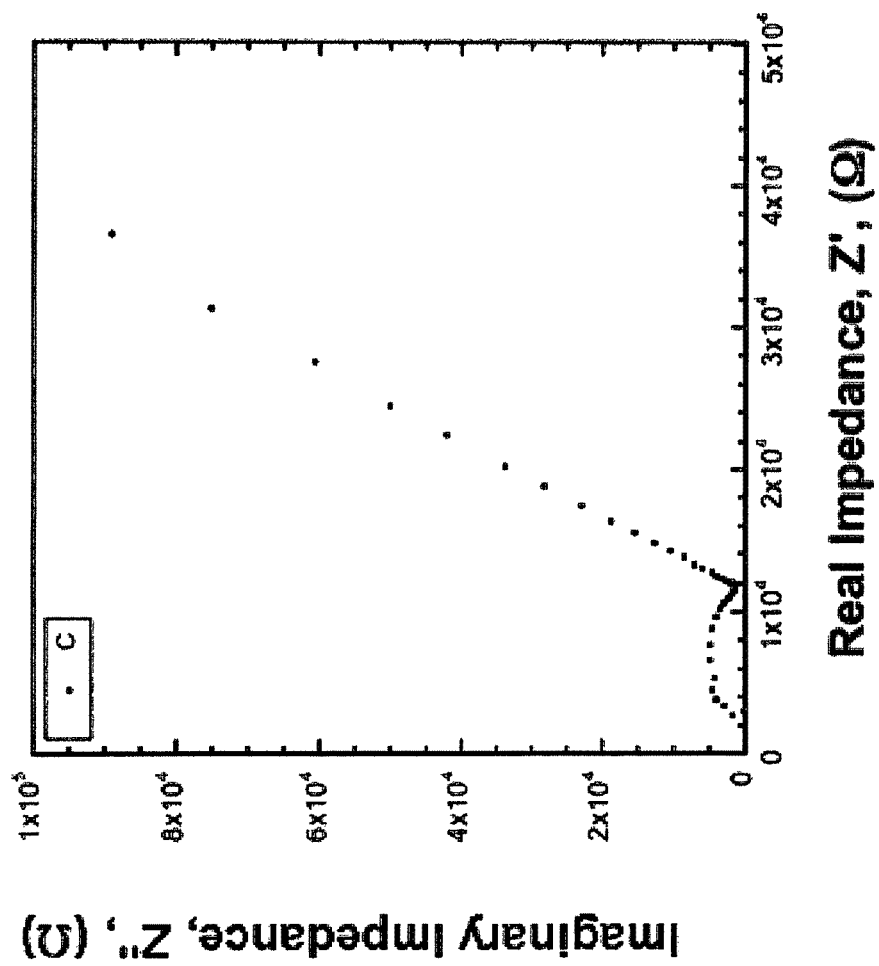
FIG. 15 is a graph of imaginary versus real impedance collected from LBLTO at room temperature.

As with the KSICON pellets above, LBLTO pellets were coated with gold electrodes for room temperature EIS. FIG. 15 plots the imaginary versus real impedance for LBLTO collected at room temperature. The higher density of these ceramic pellets allowed for a more complete impedance measurement. After fitting the data to a circuit model (Z-plot), the room temperature Li-ion conductivity in these materials was determined to be ~$3 \times 10^{-5}$ S/cm, a value consistent with literature reports of similar materials. See V. Thangadurai and W. Weppner, *Adv. Funct. Mater.* 15, 107 (2005).

High Temperature Electrochemical Behavior

High temperature electrochemical testing of the KSICON and LBLTO ceramics in contact with molten salts provided information about the stability, ionic conductivity, and ionic selectivity of these ceramic materials under more relevant conditions. Both KSICON and LBLTO ceramics were tested under identical conditions, and for the sake of simplicity, the results from both materials types are described together below.

Ideally, these tests would have been conducted according to the scheme shown in FIG. 2, in which charge balance is maintained through the oxidation and reduction of chlorine. However, an alternative scheme was devised to more safely and immediately assess the selective ion-transport properties of the KSICON and LBLTO ceramics at 500° C. This alternative scheme utilized stacks of molten salt pellets, separated by ceramic ion conductors, all sandwiched by a copper anode and a stainless steel cathode (a stainless steel current collector was also placed in contact with the copper anode). In this system, shown in FIGS. 16A and 16B, charge balance is maintained not through the oxidation and reduction of chlorine, but through the oxidation of copper metal at the anode and the reduction of either copper or lithium at the cathode.

Key to this process was the development of molten salt pellets (as shown in FIG. 6B), which are similar to those used in thermal battery systems. These pellets were pressed from mixtures of target salts, as shown in Table 2, and an electrochemically inert, inorganic electrolyte binder that allowed the pellets to maintain their shape and integrity within the assembled testing stacks at 500° C., even after melting of the molten salt.

TABLE 2

Compositions of electrolyte binder pellets used for electroreduction studies. All values are weight percents.

|         | LiCl | KCl  | CsCl | CuCl₂ |
|---------|------|------|------|-------|
| LK-EB   | 44   | 56   | 0    | 0     |
| CsLK-EB | 40.1 | 48.7 | 11.2 | 0     |
| CuLK-EB | 32.7 | 41.6 | 0    | 25.7  |

Electrochemical Impedance

Figure 17:
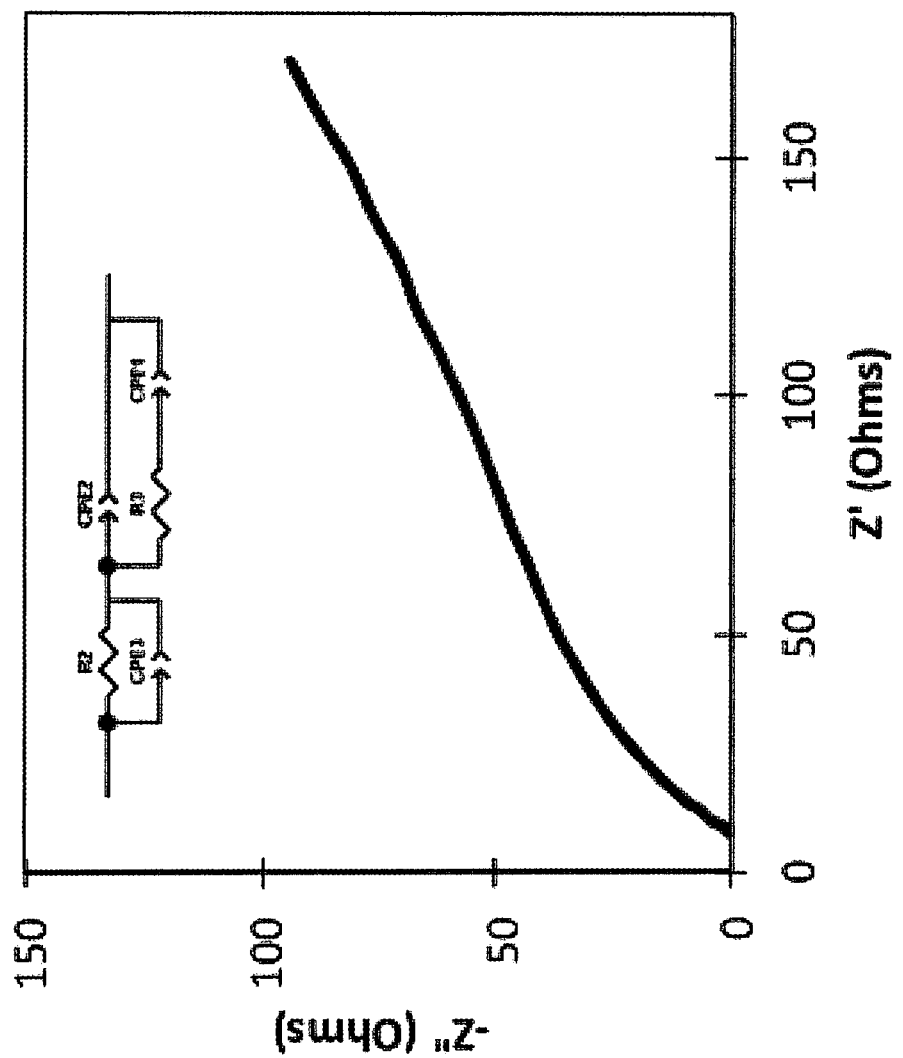
FIG. 17 is a graph of real versus imaginary impedance for KSICON at 500° C. between two LK-EB pellets. Inset is the equivalent circuit used to fit the data.

Impedance measurements were conducted prior to any galvanic discharge studies, which tended to produce irreversible changes to the stacks. FIG. 17 plots the imaginary versus real impedance for KSICON measured at 500° C. between two LK-EB pellets. Complete interpretation of these data is complicated by numerous interfaces, multiple transport species, and several ion-transporting phases in these systems. However, by fitting the data to the equivalent circuit, shown as an inset in FIG. 17, analysis suggests a total ionic conductivity through the ceramic membrane on the order of ~$3 \times 10^{-3}$ S/cm, an increase of several orders of magnitude relative to the room temperature results described earlier. Similar analysis of the LBLTO samples indicated conductivities on the order of ~$2 \times 10^{-2}$ S/cm, again significantly higher than the room temperature values above.

Galvanostatic Electroreduction

Figure 18:
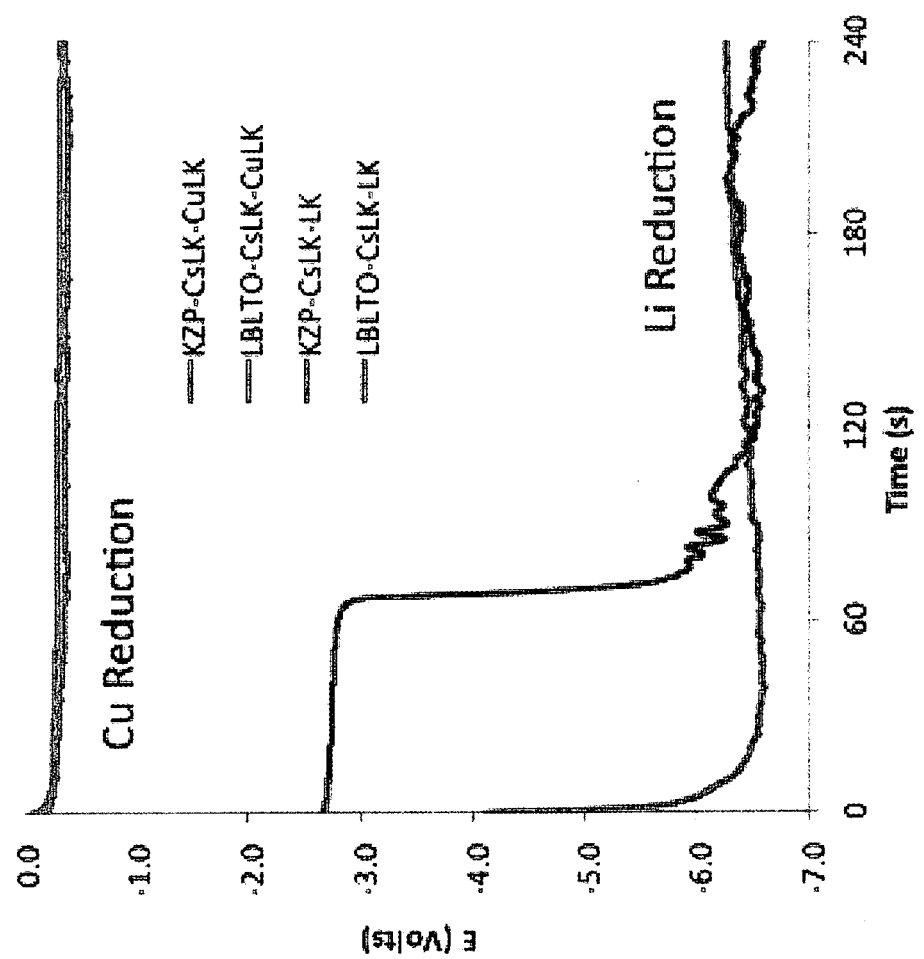
FIG. 18 is a graph of galvanostatic discharge curves for the electroreduction of copper and lithium using KSICON and LBLTO separators at 100° C. Curves were obtained at a constant current density of 100 $mA/cm^2$.

The practical value of the conductivity in these materials, however, is better illustrated by the galvanostatic electroreduction experiments. Discharge curves generated during the cathodic electroreduction of both Cu²⁺ and Li⁺ using both LBLTO and KSICON ion-conductors are shown in FIG. 18. Discharges were performed at a relatively high constant current density of 100 mA/cm². Electroreduction of copper was tested according to the scheme shown in FIG. 16A, in which the ionic conductors were sandwiched between CsLK-EB and CuLK-EB pellets with a copper anode and a stainless steel cathode. Current flowing through the device during discharge was expected to oxidize the copper at the anode and reduce Cu²⁺ at the cathode, theoretically a 0-volt net reaction. The discharge potential for the electroreduction of copper was a consistent 0.3V, and was similar for both LBLTO and KSICON. This small overpotential (relative to 0V) likely represents a small activation energy required to drive ionic transport across interfaces or through the ion-conducting ceramics.

Figures 16A, 16B:
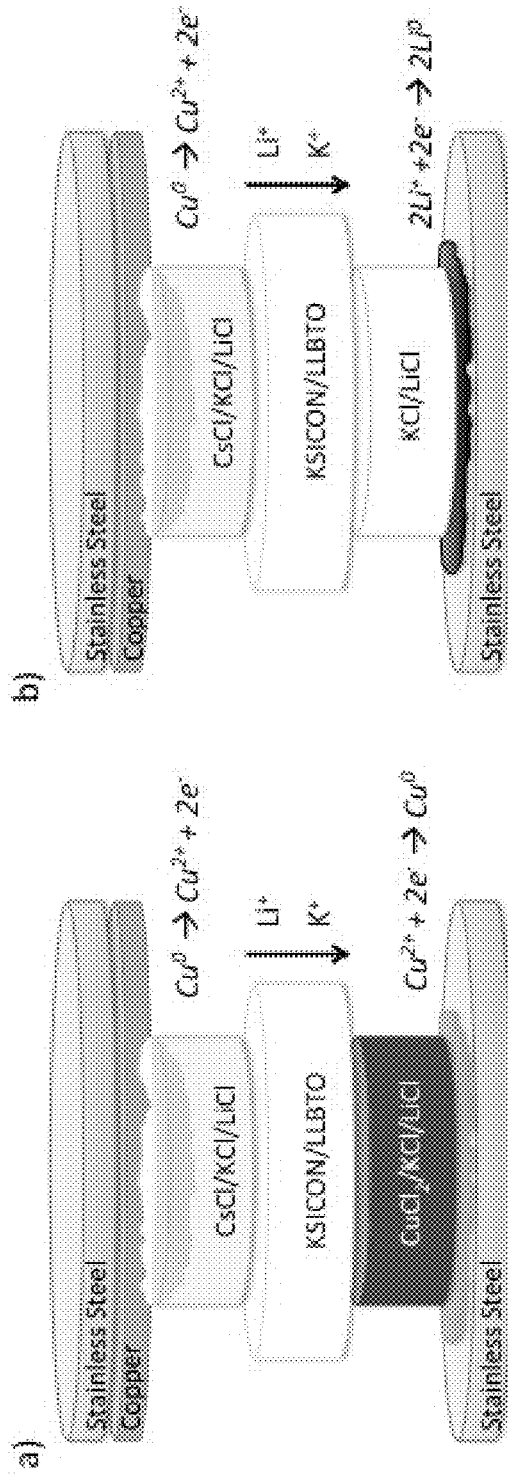
FIG. 16A is a schematic illustration of electroreduction of copper in a pellet stack using electrolyte binder pellets and an ion-conducting separator.
FIG. 16B is a schematic illustration or electroreduction of lithium in a pellet stack using electrolyte binder pellets and an ion-conducting separator.

Similar discharge experiments were performed in which LBLTO or KSICON ceramics were sandwiched between CsLK-EB and LK-EB pellets, again using a copper anode and a stainless steel cathode, as shown in FIG. 16B. In this case, the anodic half-reaction involved dissolving the Cu metal into the CsLK-EB pellet, and the cathodic reaction involved reduction of Li⁺ in the LK-EB pellet to Li metal. The discharge curves seen in FIG. 18 show an increase in the discharge potential to slightly greater than 6V. This value is considerably higher voltage than the ~3.4V expected for the sum of the half reactions for lithium reduction and copper oxidation, indicating a significant overpotential, likely associated with the formation of lithium metal at the LK-EB/Stainless steel interface. There is also a notable intermediate voltage plateau in the LBLTO case. This plateau may be due to secondary reactions in the LBLTO pellets. This observation suggests that in the development of a larger-scale system, the reduced voltages of an electrochemically symmetrical system (such as the reduction/oxidation of chlorine) may offer benefits to the stability of the ceramics.

Figure 19A:
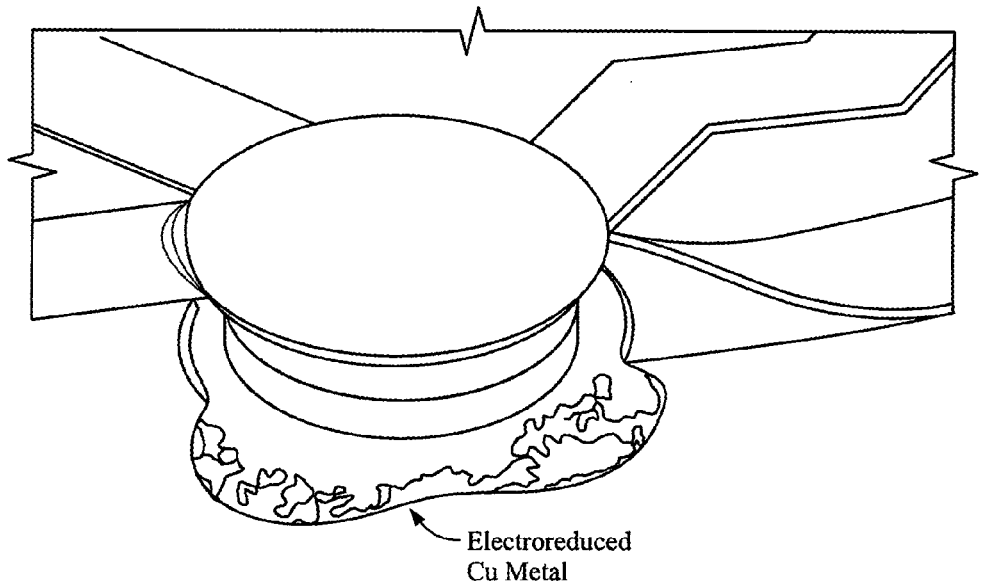
FIG. 19A-19D are photographs showing the formation of electroreduced copper metal (FIG. 19A) in tested pellet stacks (with KSICON separator). Reduced copper at the cathode and the dissolved copper anode are also visible in the dissected cell (FIG. 19B). Formation of lithium metal (evident as beads in FIG. 19C) after lithium electroreduction using LBLTO as a separator. In the dissected cell (FIG. 19D) reduced lithium is visible on the cathode and the cathode-side of the LK-EB pellet. Again, the copper anode has been clearly dissolved.
Figure 19B:
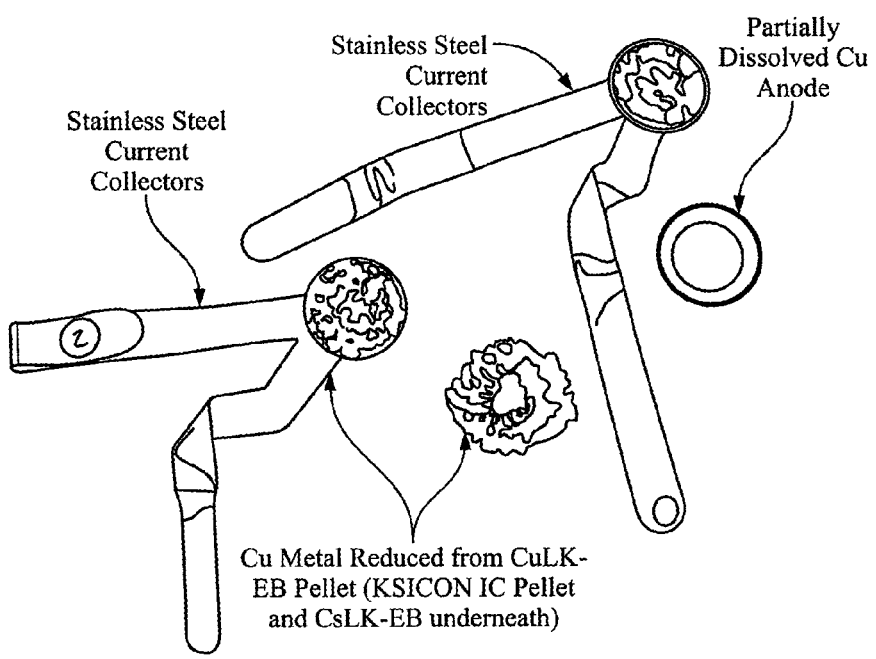
Figure 19C:
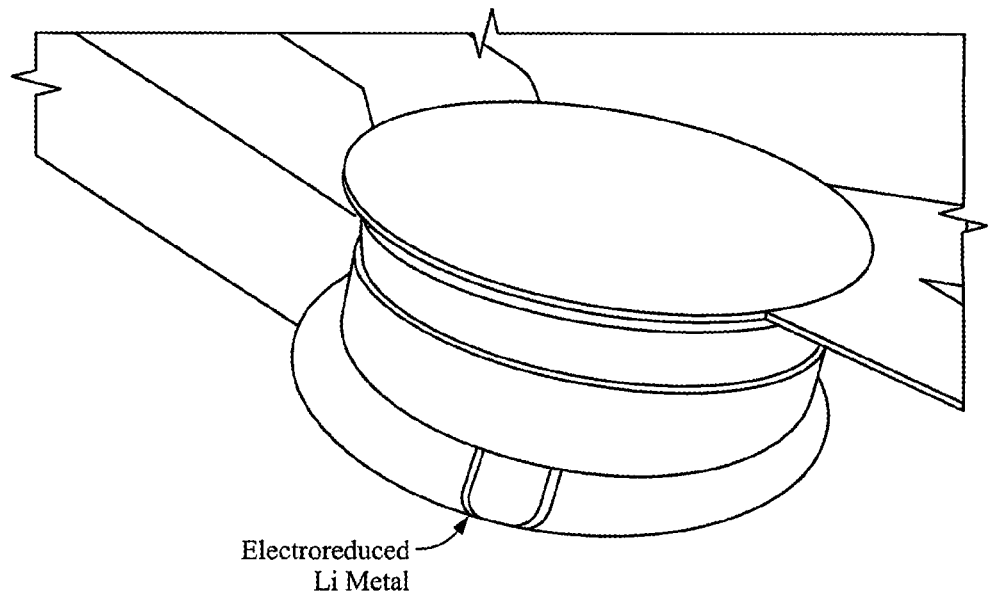
Figure 19D:
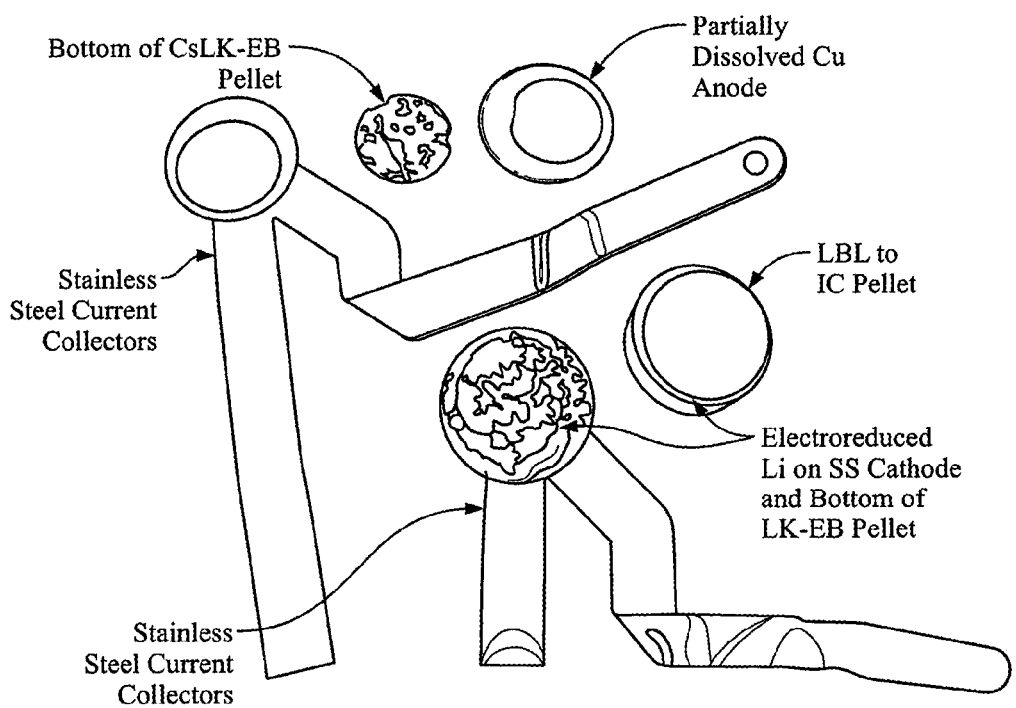

For both of these electroreduction demonstrations, and with both ceramic conductors, the electroreductions resulted in macroscopic changes in the device structure. FIGS. 19A and 19B show the copper reduction using KSICON, while FIGS. 19C and 19D show lithium reduction using LBLTO (the same results were observed for copper plating with LBLTO and lithium plating with KSICON, but only one example of each is shown for conciseness). At the cathode, reduced copper or lithium metals plated visibly at the interfaces between the stainless steel cathodes and the CuLK-EB or LK-EB pellets, respectively, as shown in FIGS. 19A and 19C. When these cells were disassembled after testing, it was evident that not only were these reduced metals visible at the cathode, but the copper anodes, originally disks, had been etched into rings with the electrochemical dissolution of the anode into CsLK-EB pellets, as shown in FIGS. 19B and 19D. Clearly, the anodic oxidation of Cu and the cathodic reduction of $Cu^{2+}$ or $Li^+$, supported by ionic transport through the ceramic membranes, were remarkable efficient. With both the KSICON and LBLTO tests, the ceramic separators remained stable and intact. These macroscopic changes to the device structure during the discharge provide compelling evidence of the highly effective ion transport properties of these ceramics at 500° C.

Ionic Selectivity During Electroreduction

These ion conductivity experiments also inform the selectivity of the ion transport. Energy dispersive x-ray spectroscopy (EDXS) was used to examine the chemical composition of molten salt pellet cross sections after testing. FIGS. 20 and 21 show a series of electron micrographs of gold-coated (for SEM imaging) EB pellet cross-sections and the corresponding EDXS spectra collected from those cross-sections.

Figure 20A:
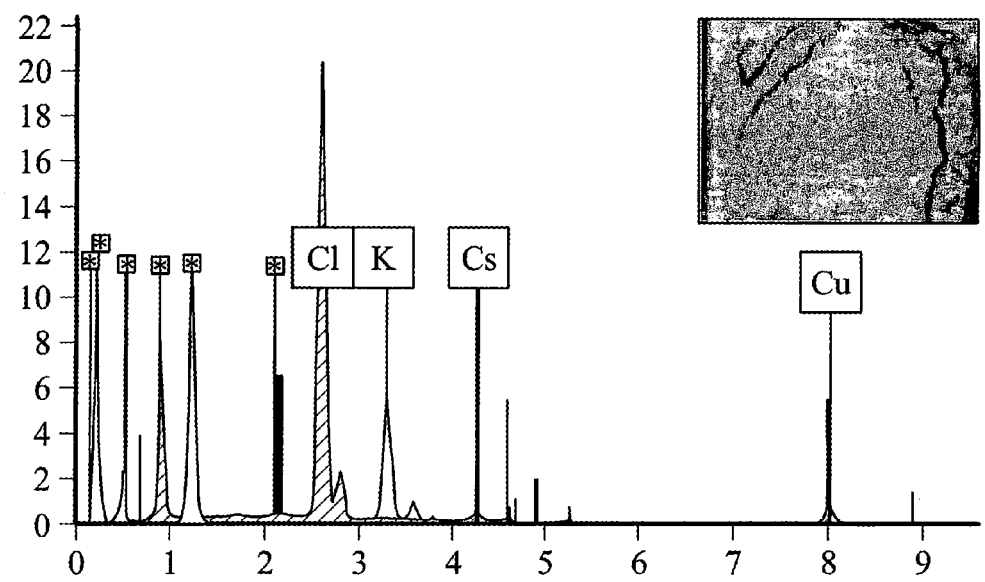
FIG. 20A shows EDXS spectra and inset SEM micrographs from CsLK-EB cross sections and FIG. 20B shows EDXS spectra from CuLK-EB pellet cross-sections after copper electroreduction at 500° C. with a KSICON separator. The presence of Cu in the CsLK-EB pellet indicates solubility of the oxidized copper anode. Absence of Cs in the CuLK-EB pellet indicates ion transport selectivity against $Cs^+$.
Figure 20B:
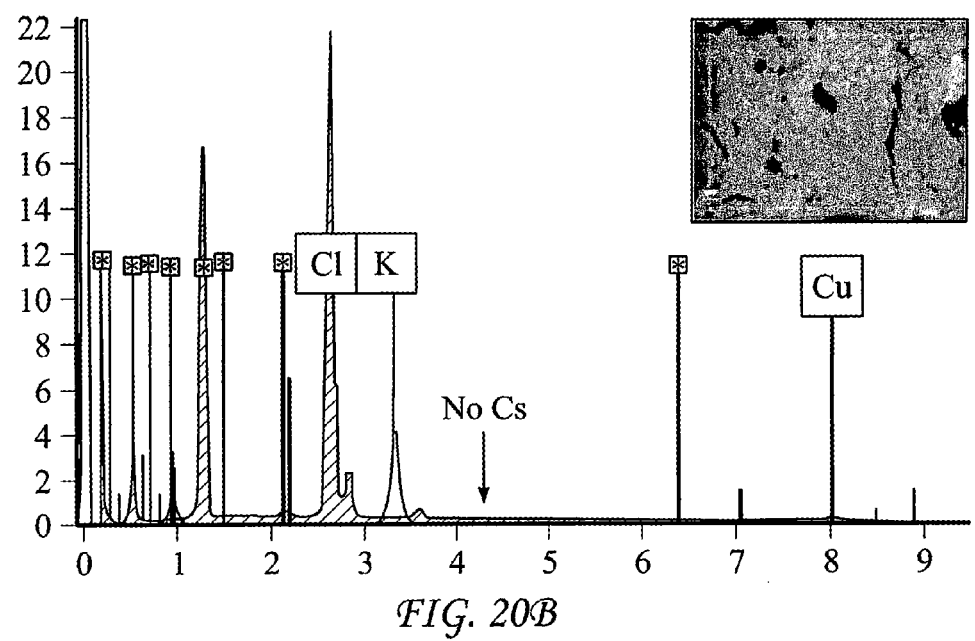

The spectrum in FIG. 20A was collected from the CsLK-EB pellet after discharge through a KSICON separator and shows evidence of the KCl salt (Li is not visible in EDXS), the CsCl salt, the inorganic binder, and copper, confirming the dissolution of anodically oxidized copper into the pellet during discharge. The data in FIG. 20B were collected from the CuLK-EB pellet in the same experiment. This spectrum shows expected peaks from KCl, residual $CuCl_2$, the inorganic binder, and a minor Fe contaminant believed to come from the stainless steel current collector. Critically, though, there is no evidence of Cs present, indicating that the Cs did NOT cross the ceramic separator in any measurable quantities.

This important evidence of ionic selectivity during the electrochemical discharge was consistent when both KSI-CON and LBLTO membranes were used. Moreover, this high temperature selectivity under DC bias is in agreement with the passive selectivity described in FIGS. 9 and 14 for KSICON and LBLTO, respectively.

Figure 21A:
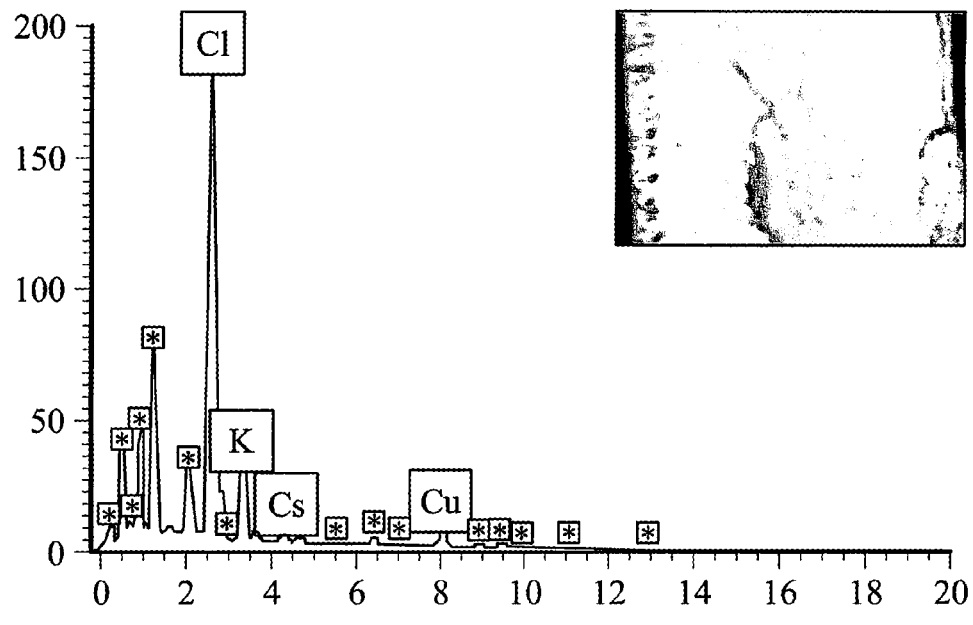
FIG. 21A shows EDXS spectra and inset SEM micrographs from CsLK-EB cross section and FIG. 21B shows LK-EB pellet cross-sections after lithium electroreduction at 500° C. with a KSICON separator. The presence of Cu in the CsLK-EB pellet indicates solubility of the oxidized copper anode. Absence of Cs and Cu in the LK-EB pellet indicates ion transport selectivity against $Cs^+$ and $Cu^{2+}$.
Figure 21B:
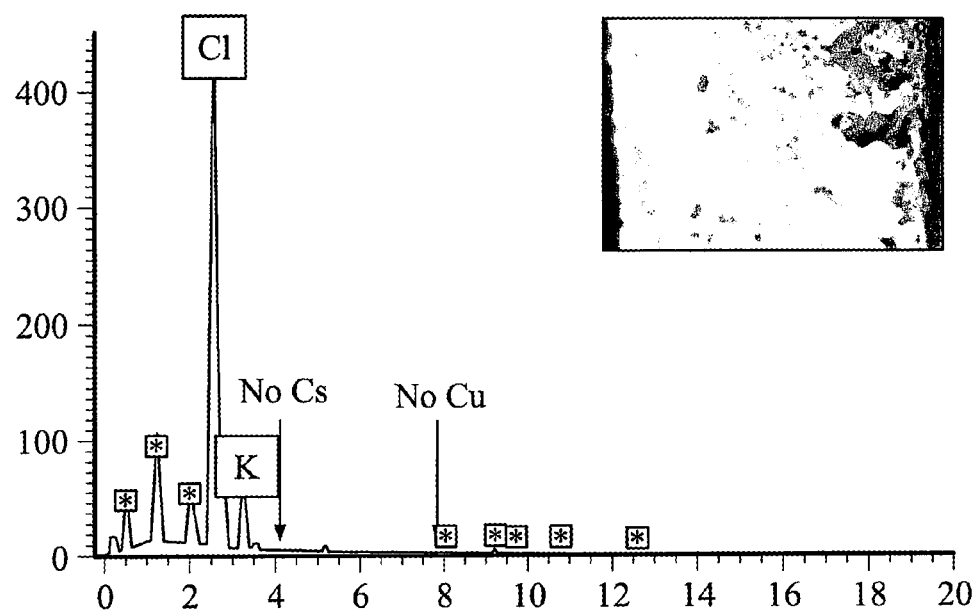

FIGS. 21A and 21B present similar data collected from EB pellets (platinum coated for SEM imaging in this case) used in the electroreduction of lithium using a KSICON separator. Once again, FIG. 21A confirms the electrochemical dissolution of copper into the CsLK-EB pellet, while the spectrum in FIG. 21B again shows the absence of any Cs in the LK-EB pellet.

Interestingly, $CuCl_2$ was not originally present in the either the anodic CsLK-EB pellet or the cathodic LK-EB pellet, which means that this system can be used to track the transport of $Cu^{2+}$ through the cell. Copper was clearly electrochemically dissolved at significant levels in the CsLK-EB pellet, but the persistent absence of copper in the anodic LK-EB pellet suggests that $Cu^{2+}$ did not cross the ceramic separator. This suggests that these ceramics are also selective divalent ion transport, which may be useful in more general molten salt purification experiments. As with the copper electroreduction, the observations for the Li reduction were the same for both KSICON and LBLTO conductors.

Subsequent analysis of the molten salt pellets using quantitative ion concentration analysis has confirmed the results provided in the EDXS experiments. Molten salt pellets from both the anodes and cathodes of the galvanostatically-discharged test cells described above were dissolved in deionized water. The samples were centrifuged to remove any insoluble materials and the supernatant was analyzed for ion content using inductively coupled plasma. Samples of these data are provided in Table 3 below:

TABLE 3

Concentrations of target ions in molten salt pellets after galvanostatic discharge through LBLTO and KSICON. CuLK-EB pellets were on the cathodic side of the cell, while CsLK-EB pellets were on the anodic side. All values are in parts per million, normalized by sample size and molecular weight.

| Salt | lithium | potassium | cesium |
|---|---|---|---|
| LBLTO: CuLK-EB | 107 | 69.1 | 0.008 |
| LBLTO: CsLK-EB | 90.8 | 66.5 | 4.97 |
| KSICON: CuLK-EB | 63.4 | 51.15 | 0.023 |
| KSICON: CsLK-EB | 138 | 97.2 | 6.47 |

The stark differences in Cs content between the CuLK-EB pellets and the Cs-LK-EB pellets provides compelling evidence for the selectivity against $Cs^+$ transport in both the LBLTO and KSICON ceramics. Moreover, analysis of the ratios of Li:K in each of the pellets, when compared with the initial ratios of these elements (Table 2), shows that both ceramics were capable of $K^+$ and $Li^+$ transport, though not surprisingly, $Li^+$ transport was slightly favored in the LBLTO case.

Process to Chemically Reduce Trace $CuCl_2$

The above description provides a process in which the electrochemical reactions involved in moving $Li^+$ and $K^+$ ions across ion-selective membranes to purify LiCl—KCl molten salts are balanced by the reduction of $CuCl_2$ and the oxidation of Cu metal. This process was proved to be very effective in facilitating $Li^+$ and $K^+$ transport, but stands to leave behind trace $CuCl_2$ in the purified salt. Therefore, FIG. 22 shows a process to chemically reduce any residual $CuCl_2$ using lithium formate or potassium formate. This process not only removes the residual $CuCl_2$, but the byproducts of the reaction are LiCl, KCl, $CO_2$ and $H_2$. In the example described below, a dark brown molten salt of $CuCl_2$—LiCl—KCl was transformed at 400° C. into a mixture of white LiCl and Cu metal (although only Li-formate was used for this example, K-formate will also work).

Concentric Reactor for Molten Salt Purification

Figures 23A, 23B:
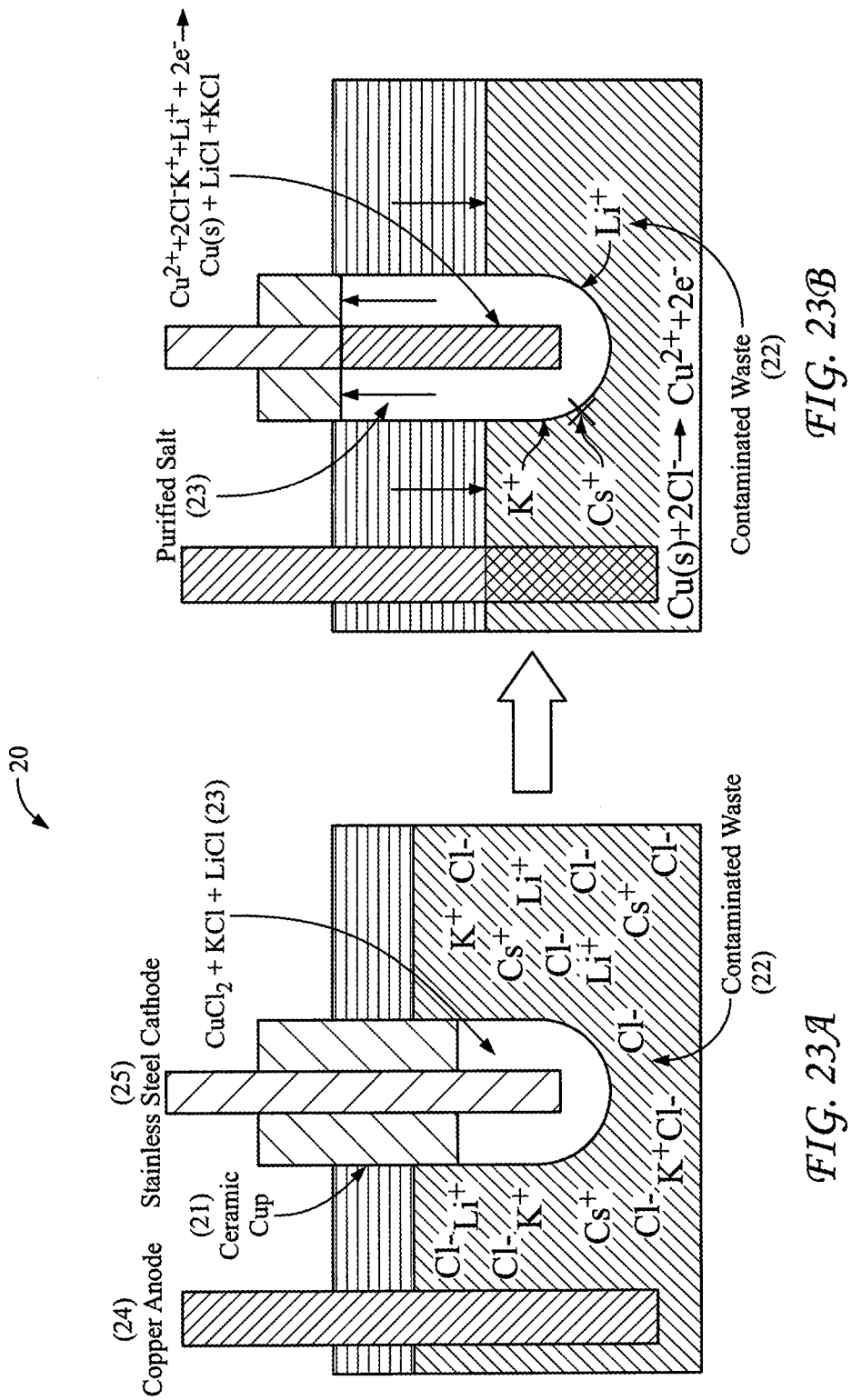
FIG. 23A is a side-view schematic illustration of "concentric reactor" for molten salt purification using closed-end ceramic tubes as the ion-conducting separator.
FIG. 23B shows the concentric reactor after purification of molten salt.

FIG. 23A shows a schematic cross-sectional illustration of a "concentric reactor" 20 for efficient bulk salt purification. Contaminated waste 22 can be placed in a stainless steel or boron nitride-coated steel vessel, heated to 500° C. (or 700° C. for LiCl purification). "Purified" KCL/LiCl salts 23, doped with $CuCl_2$ can be placed in a closed-end tube 21, or ceramic cup, formed from an ion-selective ceramic (e.g. LLTO or KSICON). This tube 21 can be lowered into the contaminated salts 22 along with a high surface area copper anode 24. A suitable (e.g., Pt, C, W, Cu, or steel) cathode 25 can be immersed into the "purified" salt 23 inside the closed-end ceramic tube 21. Under electrochemical bias, $K^+$ and $Li^+$ ions are transported across the ion-selective ceramic membrane into the ceramic tube 21, while $Cs^+$ contaminants are blocked from transport and left behind, concentrated in the contaminated salt 22. As seen in previous "pellet-based" studies, charge balance in this concentric reactor system can be maintained by oxidation of the copper anode and reduction of $Cu^{2+}$ on the cathode. Over time, the ceramic tube fills up with purified salt, while the contaminated salt is reduced in volume and concentrated, as shown in FIG. 23B. The alkali formate treatment described previously can be used to remove any residual $Cu^{2+}$ left behind in the purified salt or to recover $Cu^{2+}$ dissolved in the residual waste (ultimately, the Cu can be a recycled component of this process). This process obviates the need for high temperature stable sealants (e.g., sealing ceramic separators against steel parts), allows for higher ceramic surface area (higher transport efficiency), and can be adapted to existing pyroprocessing waste containment systems.

VCR®-Type Reactor for Molten Salt Purification

An alternative configuration can be used for volumetric purification processes. In this alternative configuration, a suitable plumbing fixture can be used to seal the ion-conducting ceramic, separating contaminated and purified salts. As an example of this configuration, Swagelok® VCR (variable compression ratio) male and female fittings 36M and 36F with a copper gasket 37 were used to seal a planar LLTO pellet 31 in a VCR assembly, as shown in FIG. 24A. This VCR assembly can be used in an electrochemical cell 30, referred to herein as a "VCR-type" reactor, that is conceptually similar to the concentric reactor scheme in FIG. 23A. As shown in FIG. 24B, once a flat, dense, uniformly thick ion-conducting ceramic pellet 31 has been sealed in the VCR assembly, the assembly and a copper anode 34 can be placed in an alumina crucible prefilled with contaminated anodic salt 32. Purified cathodic salt 33 can be placed inside the top port of the cathodic volume of the VCR assembly and a copper wire cathode 35 can be placed inside this volume. Key to this process is the electrical isolation of both the cathode 35 and the anode 34 from the stainless steel VCR assembly. It is preferable that the only pathway for charge transport in this system runs through the ionic ceramic. Therefore, an insulating alumina sheath 38 can be placed inside the cathodic "chamber" to prevent shorting of the cathode 35 to the VCR fitting 36M, and insulating alumina beads 39 can be threaded on the copper anode 34. These beads 39 prevent electrical shorting, but still allow facile contact between the copper anode 34 and the anodic salt 32. This entire reactor 30 can be placed in an insulated furnace within an Ar-atmosphere glove box, the electrical leads (not shown) can be connected to anode 34 and cathode 35, and the reactor 30 can be heated until the salt reaches 500° C. At this point both anodic and cathodic salts 32 and 33 are molten and electrochemical ion separation can occur in the cell 30.

Figure 25A:
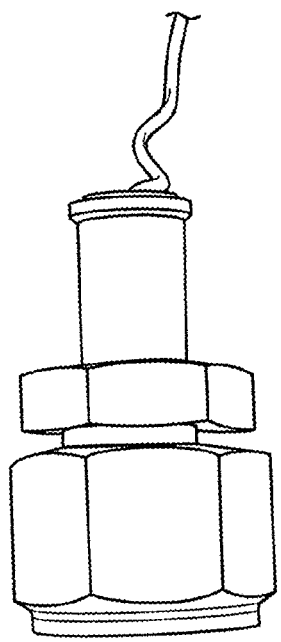
FIG. 25A is a side-view photograph of a VCR-type reactor with copper anode extending from the reactor internal volume.
Figure 25B:
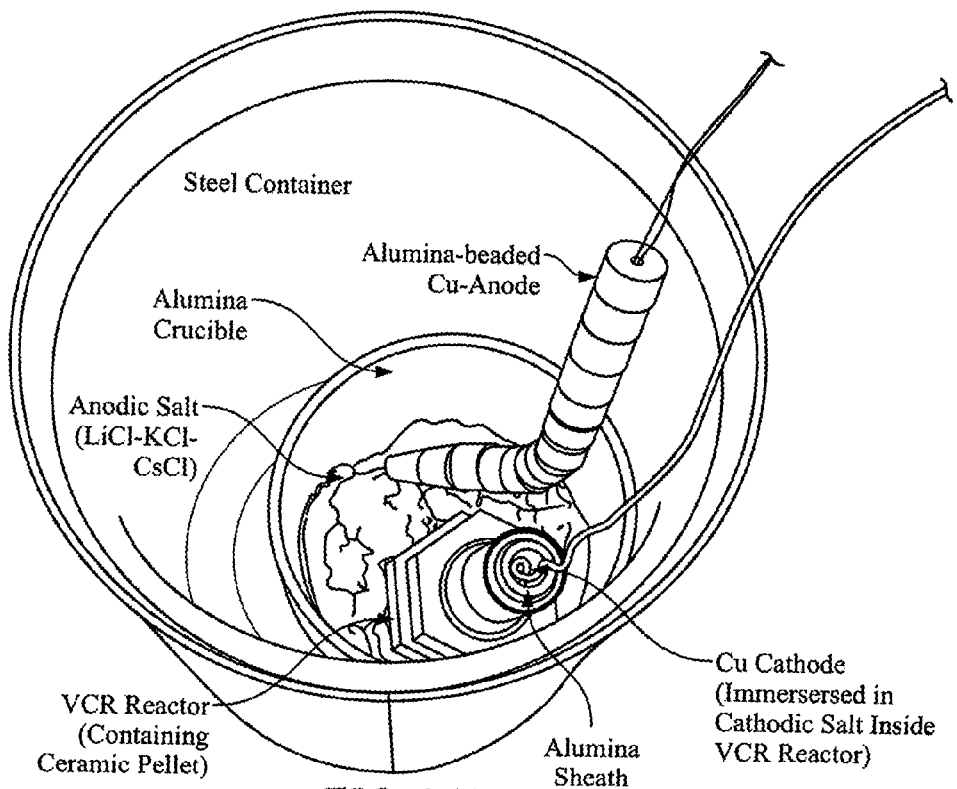
FIG. 25B is a top-view photograph of a reactor assembled in testing apparatus after cooling from an electrochemical test.

FIGS. 25A and 25B show both an individual VCR-type reactor and a VCR-reactor integrated into a functional purification assembly following an electrochemical experiment and cooling to room temperature.

Figure 26:
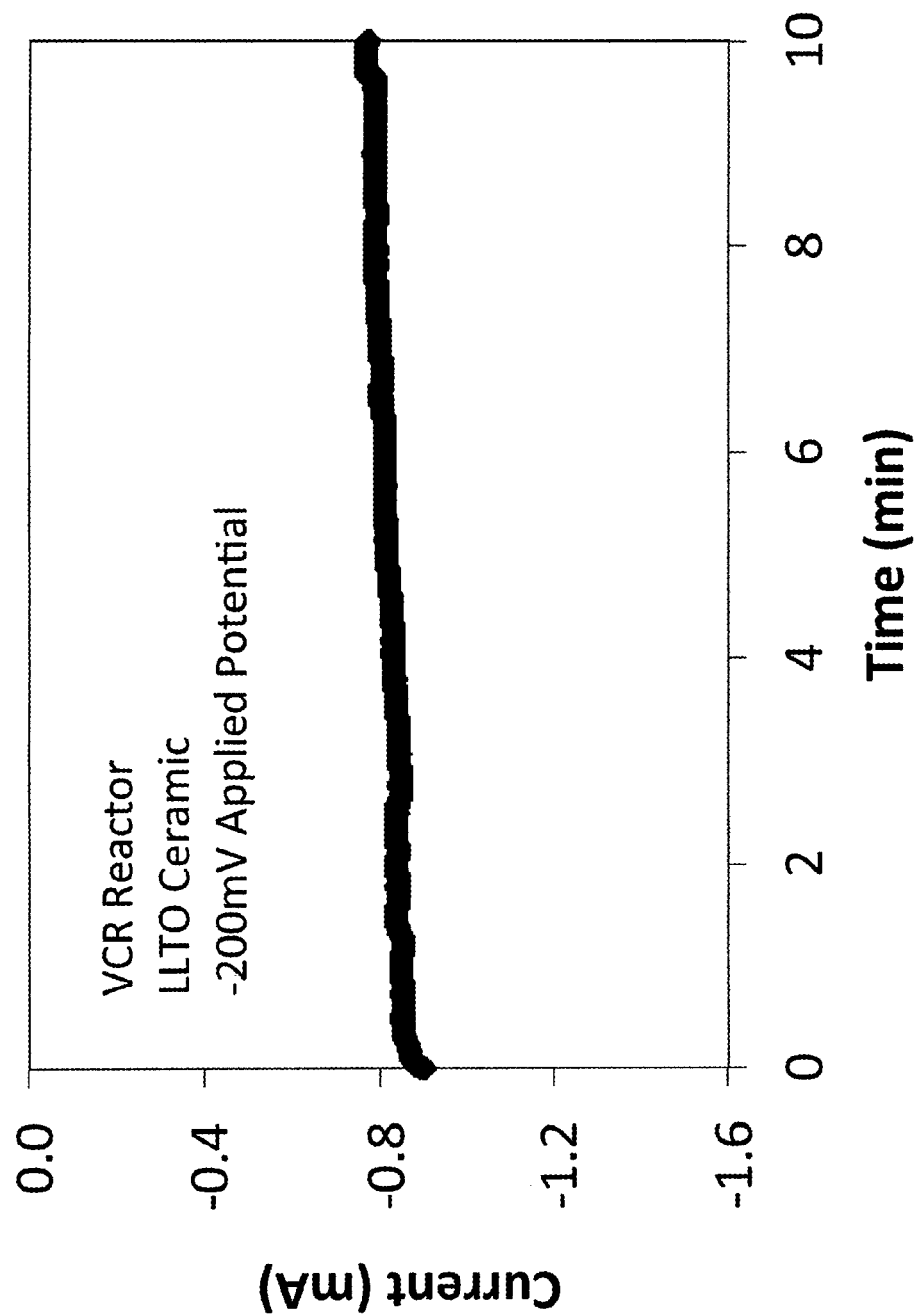
FIG. 26 is a graph of the current response over time for a VCR-type reactor cell configured with an LLTO ceramic. Constant applied potential was −200 mV across the cell. Charge balance was maintained using Cu redox chemistry.

Electrochemical tests using this volumetric configuration revealed selective ion-transport behavior consistent with those observed using the pellet stack configuration described above. FIG. 26 shows the potentiostatic discharge profile for a representative test run on an LLTO pellet using copper-mediated charge balance. These tests were typically run using 30-50 g of Cs-contaminated anodic salt and ~5-7 g of cathodic salt. The plot shows the current produced over time when a constant voltage of −200 mV was applied across the two cell electrodes. Although previous studies on the "pellet stack" configuration had included galvanostatic discharge experiments, the volumetric studies were conducted by applying a specific, constant voltage to drive ion transport. Ultimately, it would be expected that by monitoring the current in these potentiostatic experiments it may be possible to gauge the degree of impurity concentration in situ, based on the amount of ionic charge ($Li^+$ and $K^+$) passed through the ceramic separator (correlated with the measured current measured in the test cell). The data in FIG. 26 show a reasonably smooth current response to the applied voltage over the course of 10 minutes of discharge (typical tests included multiple 10-20 minute discharges with similar responses).

Control experiments run using stainless steel coupons in place of the ion-conducting ceramics showed a current response (believed to be due largely to capacitive charging of cell interfaces) more than an order of magnitude smaller than that shown here, indicating that the current measured is the result of ion-transport through the ceramic separator. These data demonstrate volumetric electrochemical reactions using the VCR-reactor configuration.

Figures 27A, 27B:
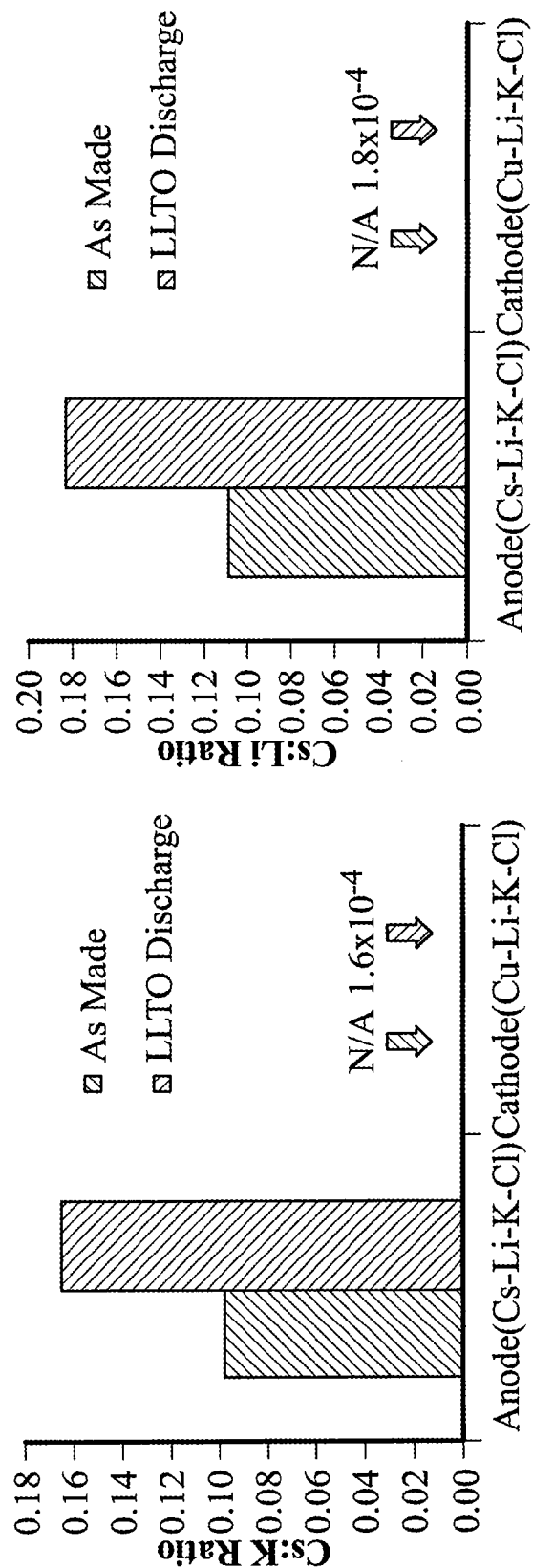
FIG. 27A is a graph of the evolution of Cs:Li cation ratio in anodic and cathodic salts
FIG. 27B is a graph of the evolution of Cs:K cation ratio in anodic and cathodic salts, indicating selective transport of $Li^+$ and $K^+$, but not $Cs^+$ through LLTO during molten salt purification.

In addition to performing volumetric electrochemical reactions, an objective of these reactions is to segregate and concentrate $Cs^+$ in the anodic salt. To determine whether or not this concentration took place during the electrochemical experiments described above, molten salt samples were taken from the cathode and anode after tests performed with LLTO pellets. These salt samples were dissolved and the elemental compositions determined. FIGS. 27A and 27B show the elemental ratios (based on atomic concentration) of Cs:K and Cs:Li for "as-made salts" as well as salts harvested from LLTO-mediated separations. Clearly, the ratios of Cs:K and Cs:Li increased substantially at the anode with no significant Cs measured at the cathode. The increases in the ratios of Cs:K and Cs:Li at the anode demonstrate that both $Li^+$ and $K^+$ were transported from the anode, while the $Cs^+$ was not, effectively concentrating the $Cs^+$ in the anodic molten salt. The notable absence of any significant Cs at the cathode is further indication of the excellent selectivity of the LLTO against $Cs^+$ transport.

Although this configuration does not provide as much surface area for ionic separation as the tube-based concentric reactor design described above, and it does require sealing of the ceramic parts within the reactor, this system does offer a number of advantages over the concentric design. First, it can be readily used to study a variety of different ceramic systems without having to developed closed-end ceramic tubes from each material—a potentially significant technical obstacle. In addition, the system is scalable. By increasing the size of the vessel containing the salt, multiple reactors, potentially containing a variety of different ceramic separators can be simultaneously used in parallel. Although this can also be achieved with closed-end tubes, again the relative ease of incorporating different materials into the same reactor scheme is an advantage of the VCR-type reactor system.

Figure 28:
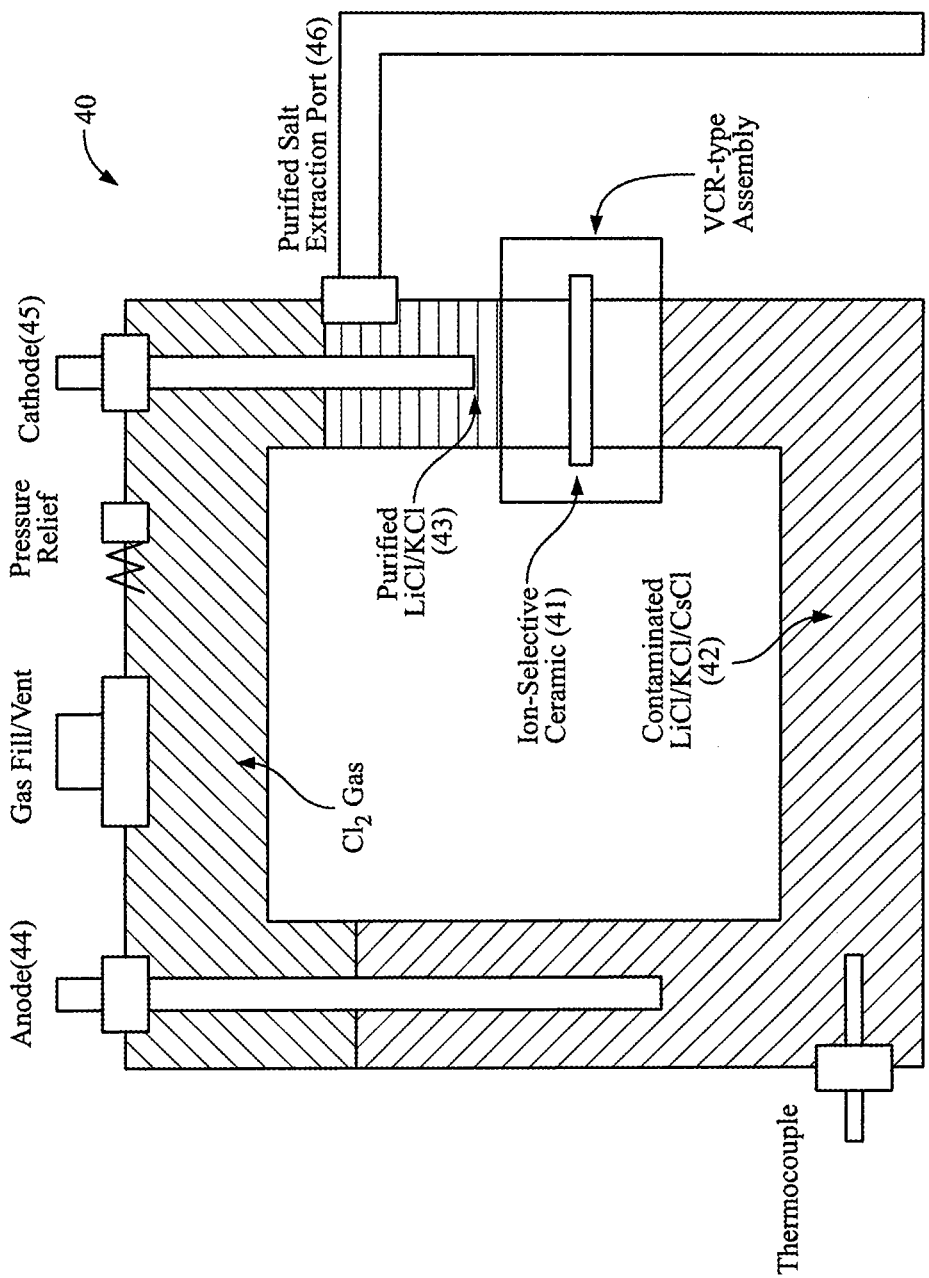
FIG. 28 is a schematic illustration of a closed-loop pipe-based reactor design incorporating the VCR-type reactor for gas-mediated salt purification.

Finally, the VCR fitting apparatus is amenable to integration into a closed system suitable for gas-mediated electrochemical purification. FIG. 28 shows a schematic illustration how the VCR-type assembly can be integrated into such a closed-loop electrochemical cell 40 using stainless steel tubing and gas-tight Swagelok® unions. The cell comprises an ion-selective ceramic membrane 41 in a VCR-type assembly, an anode 44 immersed in the contaminated molten salt 42 on anode side of the membrane 41, and a cathode 45 immersed in the purified molten salt 43 on the cathode side of the membrane 41. In this closed-loop reactor, contaminated salt can be continuously feed into the anode side and purified salt can be removed from the cathode side through an extraction port 46. The modular, connectable nature of this design makes incorporation of ports, valves, vents, and other reactor access points relatively straightforward. Moreover, because the size of the system can be varied by changing the tubing diameter, or even more easily, the tubing length, the scale of the system can also be readily varied.

The present invention has been described as a method for electrochemical ion separation. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A method for separating contaminants from a molten salt, comprising:
    providing an electrochemical cell, the electrochemical cell comprising:
        an ion-selective ceramic membrane having selectivity for at least one molten salt cation and selectivity against transport of at least one contaminant cation,
        a purified molten salt electrolyte on a cathode side of the ceramic membrane and a contaminated molten salt electrolyte on an anode side of the ceramic membrane,
        a cathode immersed in a purified molten salt electrolyte on the cathode side of the ceramic membrane, and
        an anode immersed in a contaminated molten salt electrolyte comprising the at least one molten salt cation and the at least one contaminant cation on the anode side of the ceramic membrane; and
    applying an electrical bias across the anode and the cathode, thereby causing the at least one molten salt cation to transport across the ceramic membrane but substantially excluding the at least one contaminant cation from transporting across the ceramic membrane and thereby concentrating the at least one contaminant ion in the contaminated molten salt electrolyte on the anode side of the ceramic membrane.

2. The method of claim 1, wherein the ion-selective ceramic membrane is selective by size exclusion or valence-charge exclusion of the at least one contaminant cation.

3. The method of claim 1, wherein the ion-selective ceramic membrane comprises $Na_{1+x}Zr_2Si_xP_{3-x}O_{12}$.

4. The method of claim 3, wherein the $Na_{1+x}Zr_2Si_xP_{3-x}O_{12}$ comprises cation-substituted $Na_{1+x}Zr_2Si_xP_{3-x}O_{12}$.

5. The method of claim 4, wherein the cation-substituted $Na_{1-x}Zr_2Si_xP_{3-x}O_{12}$ comprises $KZr_2(PO_4)_3$.

6. The method of claim 1, wherein the ion-selective ceramic membrane comprises a garnet-structured lithium lanthanum tantalate ceramic.

7. The method of claim 6, wherein the garnet-structured lithium lanthanum tantalate ceramic comprises $Li_6BaLa_2Ta_2O_{12}$.

8. The method of claim 1, wherein the purified and contaminated molten salt electrolytes comprise LiCl—KCl.

9. The method of claim 8, wherein the purified and contaminated molten salt electrolytes comprise a eutectic of LiCl—KCl.

10. The method of claim 8, wherein chloride ions in the contaminated molten salt electrolyte are oxidized to form chlorine gas at the anode and the chlorine gas is reduced to chloride ions at the cathode.

11. The method of claim 1, wherein the at least one contaminant cation comprises a fission product.

12. The method of claim 1, wherein the at least one contaminant cation comprises a monovalent cation.

13. The method of claim 12, wherein the monovalent cation comprises $Cs^+$.

14. The method of claim 1, wherein the at least one contaminant cation comprises a divalent cation.

15. The method of claim 14, wherein the divalent cation comprises $Cu^{2+}$ or $Sr^{2+}$.

16. The method of claim 1, wherein the anode comprises copper.

17. The method of claim 1, wherein the cathode comprises platinum, carbon, tungsten, copper, or steel.

18. The method of claim 1, wherein the ion-selective ceramic membrane comprises a planar configuration.

19. The method of claim 1, wherein the ion-selective ceramic membrane comprises a tubular configuration.

* * * * *